United States Patent
Huang et al.

(10) Patent No.: US 12,302,055 B2
(45) Date of Patent: May 13, 2025

(54) METHOD FOR DETECTING CONNECTION TO HEADSET PORT OF ELECTRONIC DEVICE, ELECTRONIC DEVICE, AND MEDIUM

(71) Applicant: Honor Device Co., Ltd., Shenzhen (CN)

(72) Inventors: Ting Huang, Shenzhen (CN); Changying Zhang, Shenzhen (CN); Chen Zhu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/924,004

(22) PCT Filed: Apr. 26, 2022

(86) PCT No.: PCT/CN2022/089196
§ 371 (c)(1),
(2) Date: Nov. 8, 2022

(87) PCT Pub. No.: WO2023/284362
PCT Pub. Date: Jan. 19, 2023

(65) Prior Publication Data
US 2024/0129657 A1 Apr. 18, 2024

(30) Foreign Application Priority Data
Jul. 12, 2021 (CN) .................. 202110800096.X

(51) Int. Cl.
*H04R 1/10* (2006.01)
*G06F 13/38* (2006.01)
(Continued)

(52) U.S. Cl.
CPC ........ *H04R 1/1041* (2013.01); *G06F 13/385* (2013.01); *H04R 2420/01* (2013.01); *H04R 2420/05* (2013.01)

(58) Field of Classification Search
None
See application file for complete search history.

(56) References Cited

U.S. PATENT DOCUMENTS

| 8,443,096 B2 | 5/2013 | Bolton |
| 2015/0207631 A1* | 7/2015 | Bolton .................. G06F 13/387 726/9 |

(Continued)

FOREIGN PATENT DOCUMENTS

| CN | 102428456 A | 4/2012 |
| CN | 105933810 A | 9/2016 |

(Continued)

*Primary Examiner* — Qin Zhu
(74) *Attorney, Agent, or Firm* — Conley Rose, P.C.

(57) ABSTRACT

Embodiments of this application provide a method for detecting a connection to a headset port of an electronic device, an electronic device, and a readable storage medium. When a headset component is connected to the headset port of the electronic device, if it is detected that the electronic device does not have a function of performing conversion between digital audio and analog audio and that the headset component connected to the headset port of the electronic device is an analog component, it is determined that the headset port cannot support the connected headset component. In this way, an electronic device omitting a codec can determine that an analog headset cannot be used.

20 Claims, 19 Drawing Sheets

(51) Int. Cl.
*H04M 1/60* (2006.01)
*H04M 1/72409* (2021.01)
*H04M 1/72448* (2021.01)

(56) References Cited

U.S. PATENT DOCUMENTS

| | | | |
|---|---|---|---|
| 2016/0227018 A1* | 8/2016 | Lee | H04M 1/72409 |
| 2017/0064456 A1 | 3/2017 | Backman | |
| 2017/0127203 A1 | 5/2017 | Ryu | |
| 2018/0329675 A1 | 11/2018 | Lee et al. | |
| 2021/0109878 A1* | 4/2021 | Jiang | H04R 5/04 |
| 2022/0376679 A1* | 11/2022 | Huang | H03H 11/34 |

FOREIGN PATENT DOCUMENTS

| | | |
|---|---|---|
| CN | 110278508 A | 9/2019 |
| CN | 210721446 U | 6/2020 |

* cited by examiner

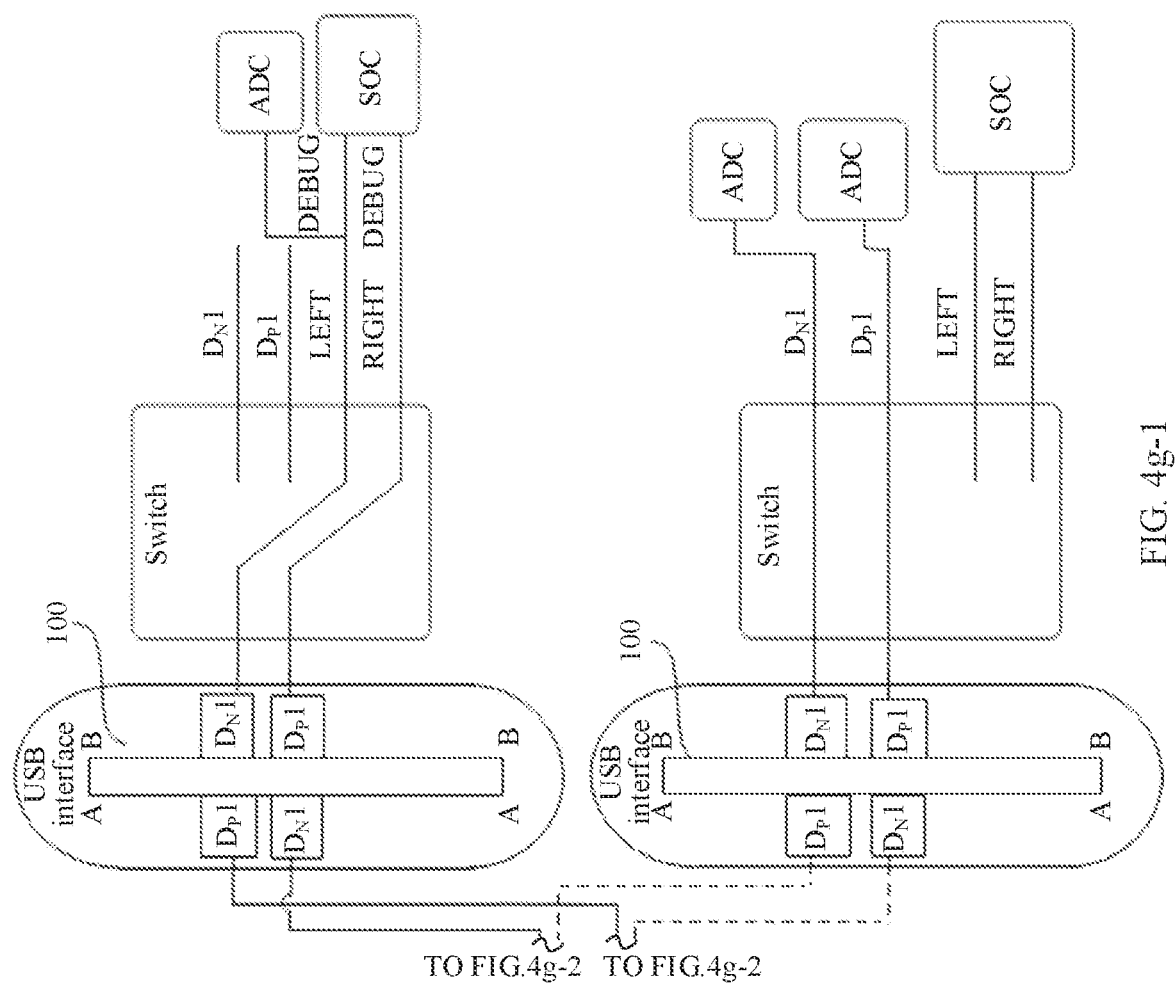

METHOD FOR DETECTING CONNECTION TO HEADSET PORT OF ELECTRONIC DEVICE, ELECTRONIC DEVICE, AND MEDIUM

CROSS-REFERENCE TO RELATED APPLICATIONS

This application is a U.S. National Stage of International Application No. PCT/CN2022/089196 filed on Apr. 26, 2022, which claims priority to Chinese Patent No. 202110800096.X, filed with the China National Intellectual Property Administration on Jul. 12, 2021, both of which are incorporated herein by reference in their entireties.

TECHNICAL FIELD

The present invention relates to the field of electronic technologies, and in particular, to a method for detecting a connection to a headset port of an electronic device, an electronic device, and a readable storage medium.

BACKGROUND

Configuring a codec (codec) in an electronic device leads to high costs and a large occupied area. Therefore, omitting a codec in electronic devices becomes a trend.

However, if the codec is omitted in electronic devices, an analog headset or an analog adapter cannot be supported. Therefore, an analog headset inserted into a headset port of an electronic device directly or through an analog adapter cannot be used. Based on this, it is required that an electronic device not configured with a codec can determine that an analog headset cannot be used when the analog headset is inserted into the electronic device not configured with a codec.

SUMMARY

This application provides a method for detecting a connection to a headset port of an electronic device, an electronic device, and a readable storage medium, so that an electronic device omitting a codec can determine that an analog headset cannot be used.

To achieve the above objective, the invention provides the following technical solutions.

According to a first aspect, this application provides an electronic device, including a headset port and a processor. The headset port is configured for a headset component to be connected, and the headset component includes a headset or a headset adapter. The processor is configured to determine that the headset port does not support the connected headset component in a case that it is determined that the electronic device does not have a function of performing conversion between digital audio and analog audio and that the headset component connected to the headset port is an analog component.

It can be seen from the above content that, when the headset component is connected to the headset port, if a processor detects that the electronic device does not have the function of performing conversion between digital audio and analog audio and that the headset component connected to the headset port is the analog component, it is determined that the headset port cannot support the connected headset component. In this way, an electronic device omitting a codec can determine that an analog headset cannot be used.

In a possible implementation, in order to determine that the electronic device does not have the function of performing conversion between digital audio and analog audio, the processor is further configured to: acquire configuration information of the electronic device, and determine that the configuration information of the electronic device does not include attribute information of a codec that supports conversion between digital audio and analog audio.

In a possible implementation, in order to determine that the electronic device does not have the function of performing conversion between digital audio and analog audio, the processor is further configured to: send a request to the codec, and determine that no response message is received from the codec that supports conversion between digital audio and analog audio within a preset time period.

In a possible implementation, in order to determine that the electronic device does not have the function of performing conversion between digital audio and analog audio, the processor is further configured to: read a level value of a configuration bit of the codec, and determine that the level value of the configuration bit of the codec is a target value, where the target value is used for indicating that the electronic device is not configured with the codec that supports conversion between digital audio and analog audio.

In a possible implementation, in order to determine that the headset component is the analog component, the processor is further configured to detect that level values of dual CC pins of the headset port are low levels.

In this implementation, by detecting whether the level values of the dual CC pins of the headset port are low levels, it can be determined whether the headset component connected to the headset port is the analog headset or the analog adapter connected to the analog headset.

In a possible implementation, a target pin of the headset port of the electronic device is connected to a detection interface, and the detection interface is configured to detect a level of the target pin, and the target pin includes a left channel pin, a right channel pin, a first pin, or a second pin, where the first pin is configured to transmit a signal of a microphone or the ground, and the second pin is configured to transmit a high-speed signal. In order to determine that the headset component is the analog component, the processor is further configured to detect that the level value of the target pin is a low level through the detection interface.

In this implementation, by detecting whether the level value of the target pin of the headset port is a low level, it can be determined whether the headset component connected to the headset port is the analog adapter.

In a possible implementation, the electronic device further includes at least one or any combination of a motor, a display, or an indicator, configured to output prompt information in response to an instruction generated in a case that the processor determines that the headset port does not support the connected headset component, where the prompt information is used for indicating that the headset port does not support the connected headset component.

In this implementation, by outputting the prompt message indicating that the headset port does not support the connected headset component, a user can be reminded that the headset component inserted into the headset port is wrong, so that the user can learn that a digital headset or a digital adapter is required.

According to a second aspect, this application provides a method for detecting a connection to a headset port of an electronic device, including: determining that the electronic device does not have a function of performing conversion between digital audio and analog audio and that a headset component is an analog component when it is detected that the headset component is connected to the headset port of the electronic device, and determining that the headset port does not support the connected headset component, where the headset component includes a headset or a headset adapter.

It can be seen from the above content that, when the headset component is connected to the headset port, if it is detected that the electronic device does not have the function of performing conversion between digital audio and analog audio and that the headset component connected to the headset port is the analog component, it is determined that the headset port does not support the connected headset component. In this way, an electronic device omitting a codec can determine that an analog headset cannot be used.

In a possible implementation, a manner of determining that the electronic device does not have the function of performing conversion between digital audio and analog audio includes: acquiring configuration information of the electronic device, and determining that the configuration information of the electronic device does not include attribute information of a codec; or sending a request to the codec, and determining that no response message is received from the codec within a preset time period; or reading a level value of a configuration bit of the codec, and determining that the level value of the configuration bit of the codec is a target value, where the target value is used for indicating that the electronic device is not configured with the codec. The codec supports conversion between digital audio and analog audio.

In a possible implementation, a manner of determining that the headset component is the analog component includes: detecting that level values of dual CC pins of the headset port are low levels.

In a possible implementation, a target pin of the headset port of the electronic device is connected to a detection interface, and the detection interface is configured to detect a level of the target pin, and the target pin includes a left channel pin, a right channel pin, a first pin, or a second pin, where the first pin is configured to transmit a signal of a microphone or the ground, and the second pin is configured to transmit a high-speed signal. A manner of determining that the headset component is the analog component includes: detecting that the level value of the target pin is a low level through the detection interface.

In a possible implementation, after the determining that the headset port does not support the connected headset component, the method further includes: outputting prompt information, where the prompt information is used for indicating that the headset port does not support the connected headset component.

According to a third aspect, this application provides an apparatus for detecting a connection to a headset port of an electronic device, including: a detection unit, configured to detect that a headset component is connected to the headset port of the electronic device, where the headset component includes a headset or a headset adapter; a first determining unit, configured to detect that the electronic device does not have a function of performing conversion between digital audio and analog audio and that the headset component is an analog component; and a second determining unit, configured to determine that the headset port does not support the connected headset component.

It can be seen from the above content that, when the detection unit detects that the headset component is connected to the headset port, if the first determining unit determines that the electronic device does not have the function of performing conversion between digital audio and analog audio and that the headset component connected to the headset port is the analog component, the second determining unit determines that the headset port does not support the connected headset component. In this way, an electronic device omitting a codec can determine that an analog headset cannot be used.

In a possible implementation, a manner in which the first determining unit determines that the electronic device does not have the function of performing conversion between digital audio and analog audio includes: acquiring configuration information of the electronic device, and determining that the configuration information of the electronic device does not include attribute information of a codec; or sending a request to the codec, and determining that no response message is received from the codec within a preset time period; or reading a level value of a configuration bit of the codec, and determining that the level value of the configuration bit of the codec is a target value, where the target value is used for indicating that the electronic device is not configured with the codec that supports conversion between digital audio and analog audio.

In a possible implementation, a manner in which the first determining unit determines that the headset component is the analog component includes: detecting that level values of dual CC pins of the headset port are low levels.

In a possible implementation, a manner in which the first determining unit determines that the headset component is the analog component includes: detecting that a level value of a target pin is a low level through a detection interface.

In a possible implementation, the apparatus for detecting a connection to a headset port of an electronic device further includes: an output unit, configured to output prompt information, where the prompt information is used for indicating that the headset port does not support the connected headset component.

According to a fourth aspect, this application provides a readable storage medium storing a computer program thereon. The computer program, when executed by a processor, implements the method for detecting a connection to a headset port of an electronic device in the second aspect and any one of the optional implementations thereof.

It can be seen from the above content that, when the headset component is connected to the headset port, if it is detected that the electronic device does not have the function of performing conversion between digital audio and analog audio and that the headset component connected to the headset port is the analog component, it is determined that the headset port does not support the connected headset component. In this way, an electronic device omitting a codec can determine that an analog headset cannot be used.

BRIEF DESCRIPTION OF DRAWINGS

FIG. 4f-1 and FIG. 4f-2 is a schematic diagram of a connection circuit of the electronic device and the analog adapter according to an embodiment of this application;

FIG. 4g-1 and FIG. 4g-2 is a schematic diagram of a connection circuit of the electronic device, the analog headset, and the analog adapter according to an embodiment of this application.

DESCRIPTION OF EMBODIMENTS

In the specification, claims, and accompanying drawings of this application, the terms "first", "second", "third", and the like are intended to distinguish between different objects but do not indicate a particular order.

In this application, the term "include", "comprise", or any other variant is intended to cover non-exclusive include, so that a process, a method, an article, or a device that includes a series of elements and that not only includes such elements, but also includes other elements not explicitly listed, or may further include elements inherent in the process, the method, the article, or the device. Unless otherwise specified, an element limited by "include a/an . . . " does not exclude other same elements existing in the process, the method, the article, or the device that includes the element.

During use of an electronic device, a wired headset may be connected to the electronic device, and a user may listen to music or answer a voice call by using the wired headset.

The wired headset may be classified into an analog headset and a digital headset. The analog headset supports an analog signal, and the digital headset supports a digital signal. A plug of the analog headset is generally a 3.5-mm plug. In order to allow the headset to be connected, the electronic device is required to be configured with a 3.5-mm port. However, increasing electronic devices use a Type-C interface instead of the 3.5-mm port as a charging interface and a communication port. Therefore, like the digital headset, the analog headset uses the Type-C interface.

Figure 1A:
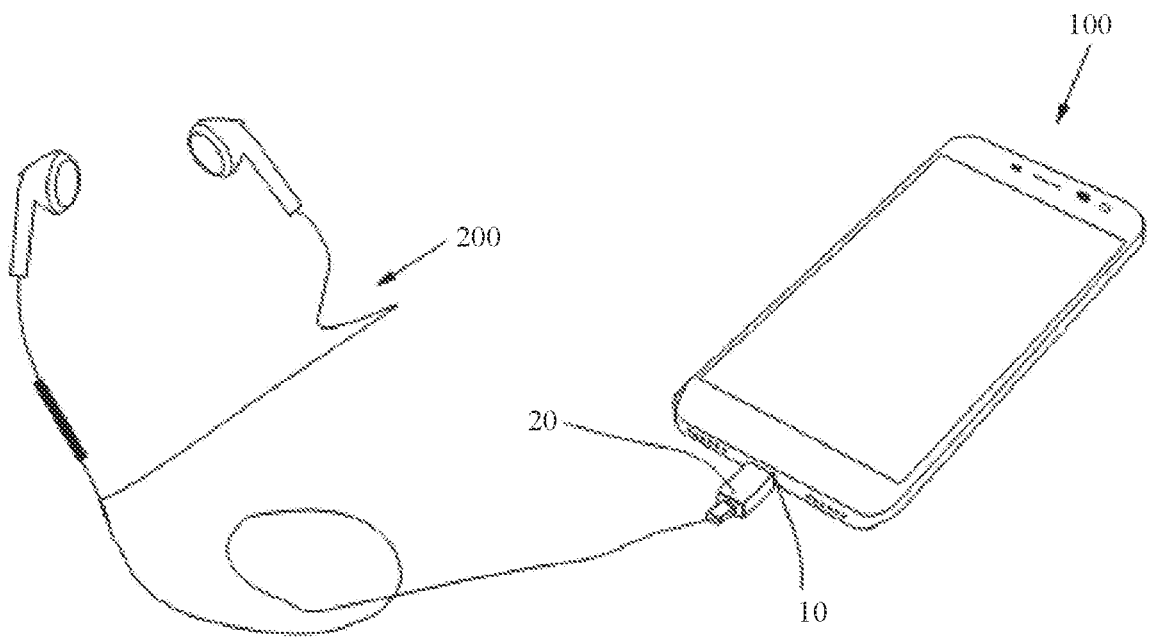
FIG. 1a is a connection diagram of an electronic device and an analog headset according to an embodiment of this application.
Figure 1B:
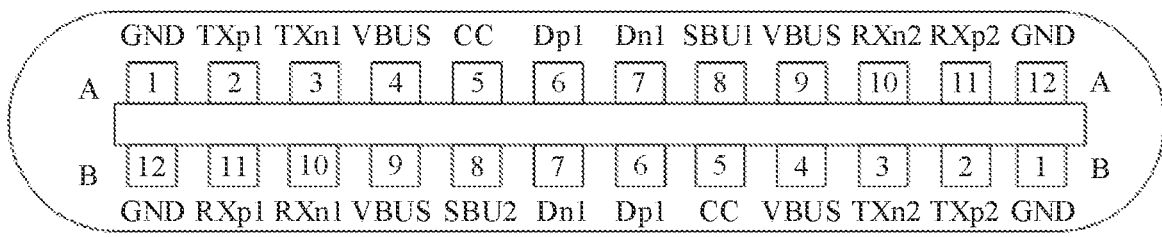
FIG. 1b is a diagram of pins of a Type-C interface according to an embodiment of this application.

FIG. 1a shows a connection diagram of an electronic device and an analog headset. A port 10 of an electronic device 100 is a Type-C interface, and a plug 20 of a headset 200 is also the Type-C interface. The Type-C interface supports reversible insertion, that is, can be inserted either side, and has 12 pins on both a surface A and a surface B. FIG. 1b provides a diagram of the internal pins of the Type-C interface.

As shown in FIG. 1b, the surface A and the surface B of the Type-C interface each include two VBUS pins (a pin 4 and a pin 9, which are configured to provide a USB voltage) symmetrically arranged, a CC pin (a pin 5), a Dp1 pin (a pin 6), a Dn1 pin (a pin 7), an SBU pin (a pin 8, which is a spare pin, the SBU pin on the surface A is marked as SBU1, and the SBU pin on the surface B is marked as SBU2), and four GND pins (pins 1 and pins 12 on the surface A and the surface B, which are configured to be grounded).

A pull-down resistor is connected to the CC pin. In this way, the electronic device can determine whether the Type-C interface supports a digital signal communication mode or an analog signal communication mode by detecting a level value of the pin, and transmit a signal of the same mode by using a corresponding pin according to the communication mode of the currently connected Type-C interface. Specifically, if the Type-C interface supports the analog signal communication mode, the electronic device transmits an analog signal by using the Dp1 pin, the Dn1 pin, and the SBU pin. If the Type-C interface supports the digital signal communication mode, the electronic device transmits a digital signal by using the RXp1 pin, the RXn1 pin, the TXp1 pin, the TXn1 pin, the RXp2 pin, the RXn2 pin, the TXp2 pin, and the TXn2 pin.

Figure 1C:
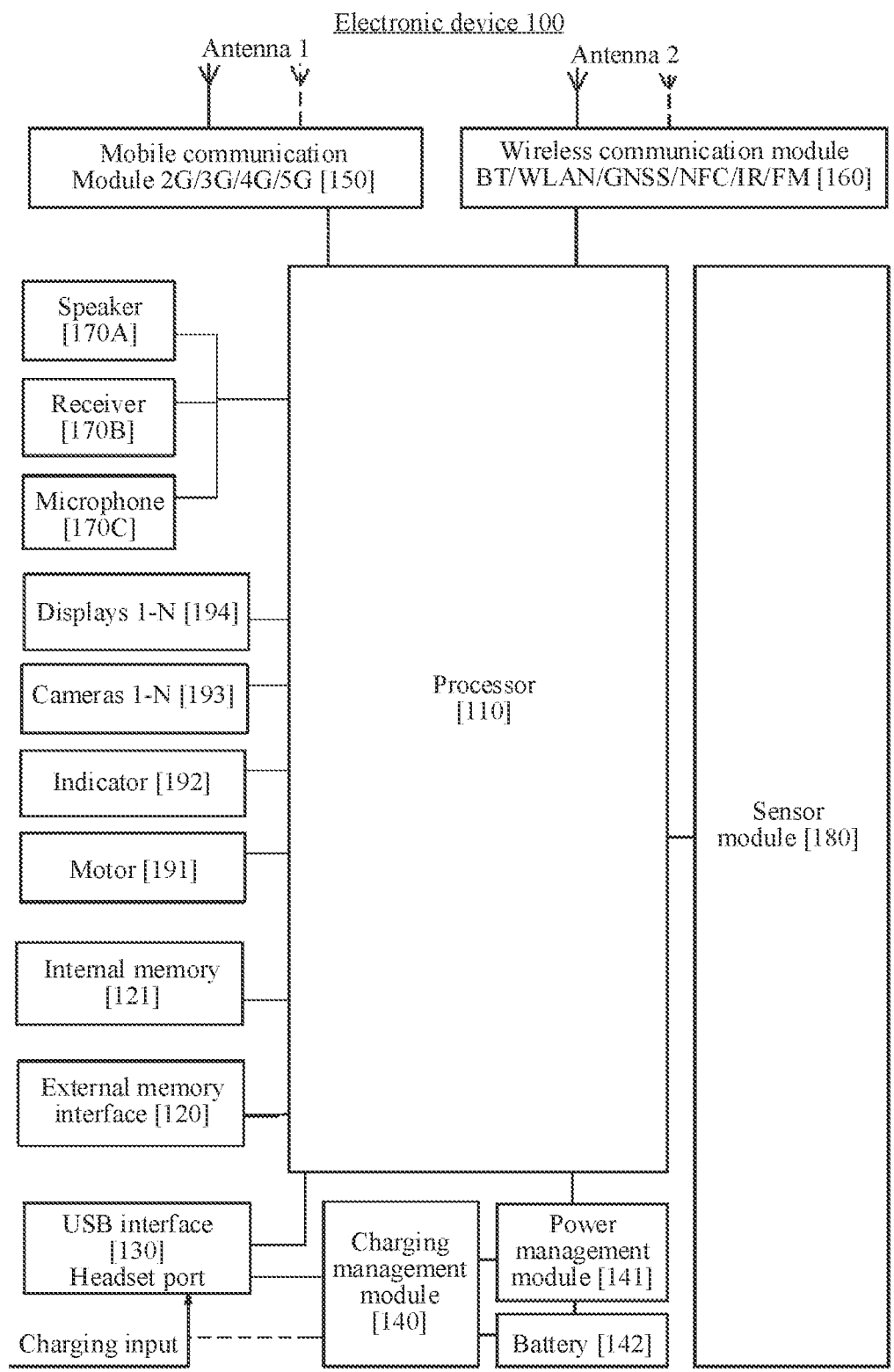
FIG. 1c is a schematic composition diagram of a hardware structure of the electronic device according to an embodiment of this application.

FIG. 1c is a schematic structural diagram of the electronic device 100. The electronic device 100 may be a mobile phone, a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, a smart watch, or the like.

For example, the electronic device is a mobile phone. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, a speaker 170A, a receiver 170B, a microphone 170C, a sensor module 180, a motor 191, an indicator 192, a camera 193, a display 194 (a flexible display), and the like.

It may be understood that the schematic structure in this embodiment of this application constitutes no specific limitation on the electronic device 100. In some other embodiments of this application, the electronic device 100 may include more or fewer components than those shown in the figure, or some components may be combined, or some components may be split, or components are arranged in different manners. The components in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors. The processor may be a nerve center and a command center of the electronic device 100. The processor may generate an operating control signal according to an instruction operation code and a sequence signal, to complete control of fetching and executing an instruction.

A memory may be further disposed in the processor 110, and is configured to store instructions and data. In some embodiments, the memory in the processor 110 is a cache memory. The memory may store an instruction or data that is recently used or cyclically used by the processor 110. If the processor 110 needs to use the instruction or the data again, the processor may directly invoke the instruction or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like.

The charging management module 140 is configured to receive a charging input from a charger. The charging management module 140 may supply power to the electronic device by using the power management module 141 while charging the battery 142. The power management module 141 is configured to connect to the battery 142, the charging management module 140, and the processor 110. The power management module 141 receives an input of the battery 142 and/or the charging management module 140, to supply power to the processor 110, the internal memory 121, an external memory, the flexible display 194, the camera 193, the wireless communication module 160, and the like. The power management module 141 may be further configured to monitor parameters such as a battery capacity, a battery cycle count, and a battery state of health (electric leakage and impedance).

A wireless communication function of the electronic device 100 may be implemented by using the antenna 1, the antenna 2, the mobile communication module 150, the wireless communication module 160, the modem processor, the baseband processor, and the like.

The electronic device 100 implements a display function by using the GPU, the flexible display 194, the AP, and the like.

The electronic device 100 may implement a photographing function by using the ISP, the camera 193, the video codec, the GPU, the flexible display 194, the AP, and the like.

The internal memory 121 may be configured to store computer executable program code, and the executable program code includes instructions. The processor 110 runs the instruction stored in the internal memory 121, to perform various function applications and data processing of the electronic device 100. The internal memory 121 may include a program storage region and a data storage region. The program storage region may store an operating system, an application program required by at least one function (for example, a voice playing function or an image playing function), and the like. The data storage region may store data (for example, audio data and an address book) and the like created when the electronic device 100 is used. In addition, the internal memory 121 may include a high-speed random access memory, or may include a non-volatile memory such as at least one magnetic disk memory, a flash memory, or a universal flash storage (universal flash storage, UFS).

The electronic device 100 may implement an audio function by using the speaker 170A, the receiver 170B, the microphone 170C, the headset port, the application processor, and the like, such as music playback or recording.

The headset port is a USB interface 130 configured to connect the wired headset. In this embodiment of this application, the USB interface 130 is an interface that conforms to the USB standard specification, and specifically may be a USB Type C interface or the like. The USB interface 130 may be configured to connect to the charger to charge the electronic device 100, or may be used for data transmission between the electronic device 100 and a peripheral device, or may be configured to connect to a headset, to play audio by using the headset. The interface may alternatively be configured to connect to another electronic device such as an AR device.

The motor 191 may generate a vibration prompt.

The indicator 192 may be an indicator light, and may be configured to indicate a charging state or a battery change, or may be further configured to indicate a message, a missed call, a notification, or the like.

As shown in FIG. 1a, an analog headset is connected to the electronic device. Since the analog headset cannot parse a digital signal, digital-to-analog conversion is required to be performed on digital audio outputted by the electronic device by a codec (codec) to obtain an analog signal, so as to be provided to the analog headset. In addition to the analog headset, the analog signal obtained after the digital-to-analog conversion performed by the codec may be further provided to the speaker and receiver for outputting. Voice information collected by the microphone may alternatively be provided to the electronic device after the analog-to-digital conversion by the codec.

Configuring the codec in the electronic device increases costs and increase a motherboard area. In addition, since the speaker, the receiver, and the microphone are gradually replaced by digital products, and the digital headset is widely used by people, omitting the codec in electronic devices is a research direction of electronic devices.

However, since a user cannot learn whether an electronic device is configured with the codec, when the user inserts the analog headset having the Type-C interface into an electronic device not configured with the codec, the analog headset cannot be used, and the user does not know a reason why the analog headset cannot be used is that the electronic device is not configured with the codec rather than that the analog headset is damaged. Based on this, when the user inserts the analog headset into the electronic device not configured with the, the electronic device is required to remind the user that the analog headset cannot be used. This is a function required for the electronic device not configured with the codec.

As described above, in order to remind the user that the analog headset is mistakenly inserted into the electronic device not configured with the codec, an embodiment of this application provides a method for detecting a connection to an electronic device port.

Figure 2A:
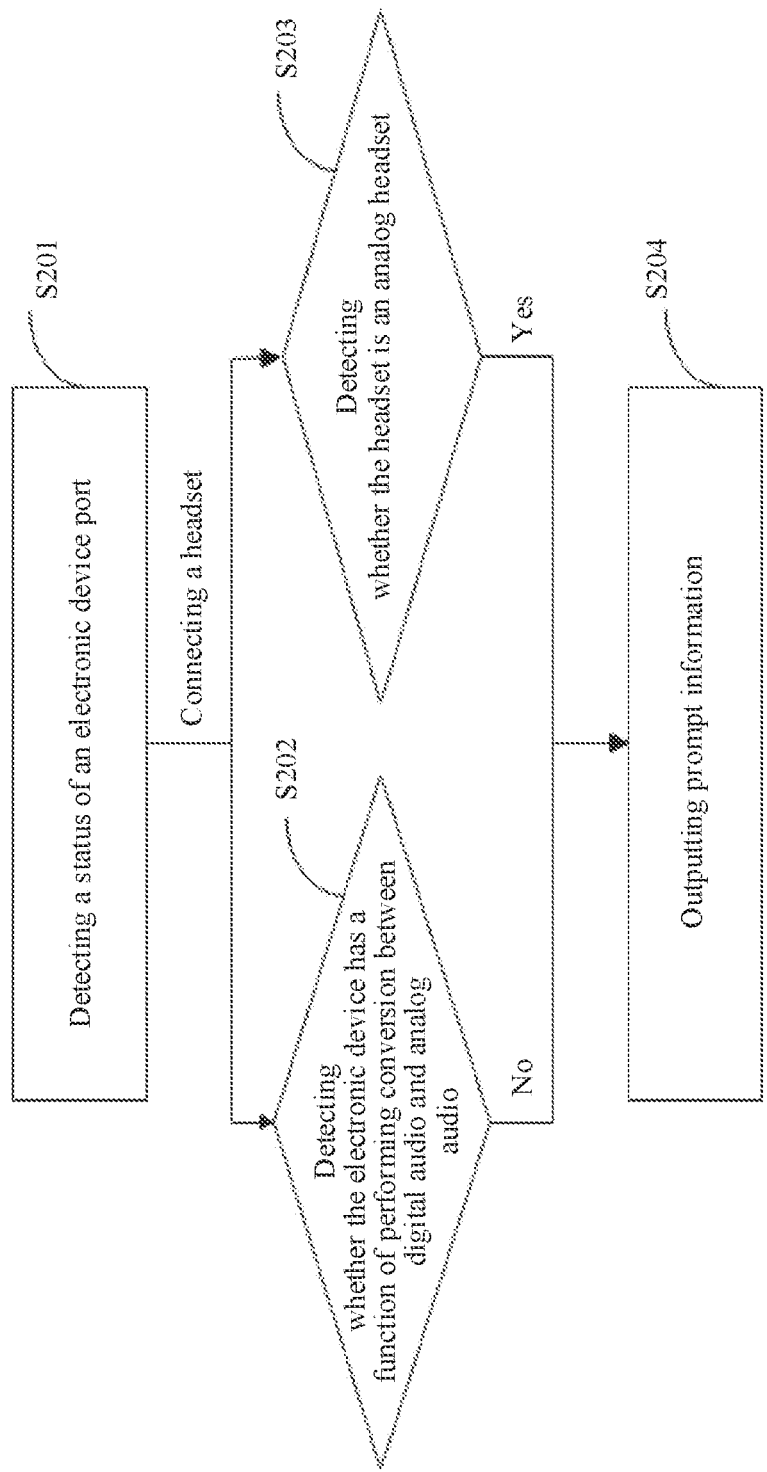
FIG. 2a is a flowchart of a method for detecting a connection to an electronic device port according to an embodiment of this application.

Referring to FIG. 2a, an embodiment of this application provides a method for detecting a connection to an electronic device port. The method includes the following steps:

S201: Detecting a status of the electronic device port.

When it is detected that a headset is connected to the electronic device port, S202 and S203 are performed.

Figure 2B:
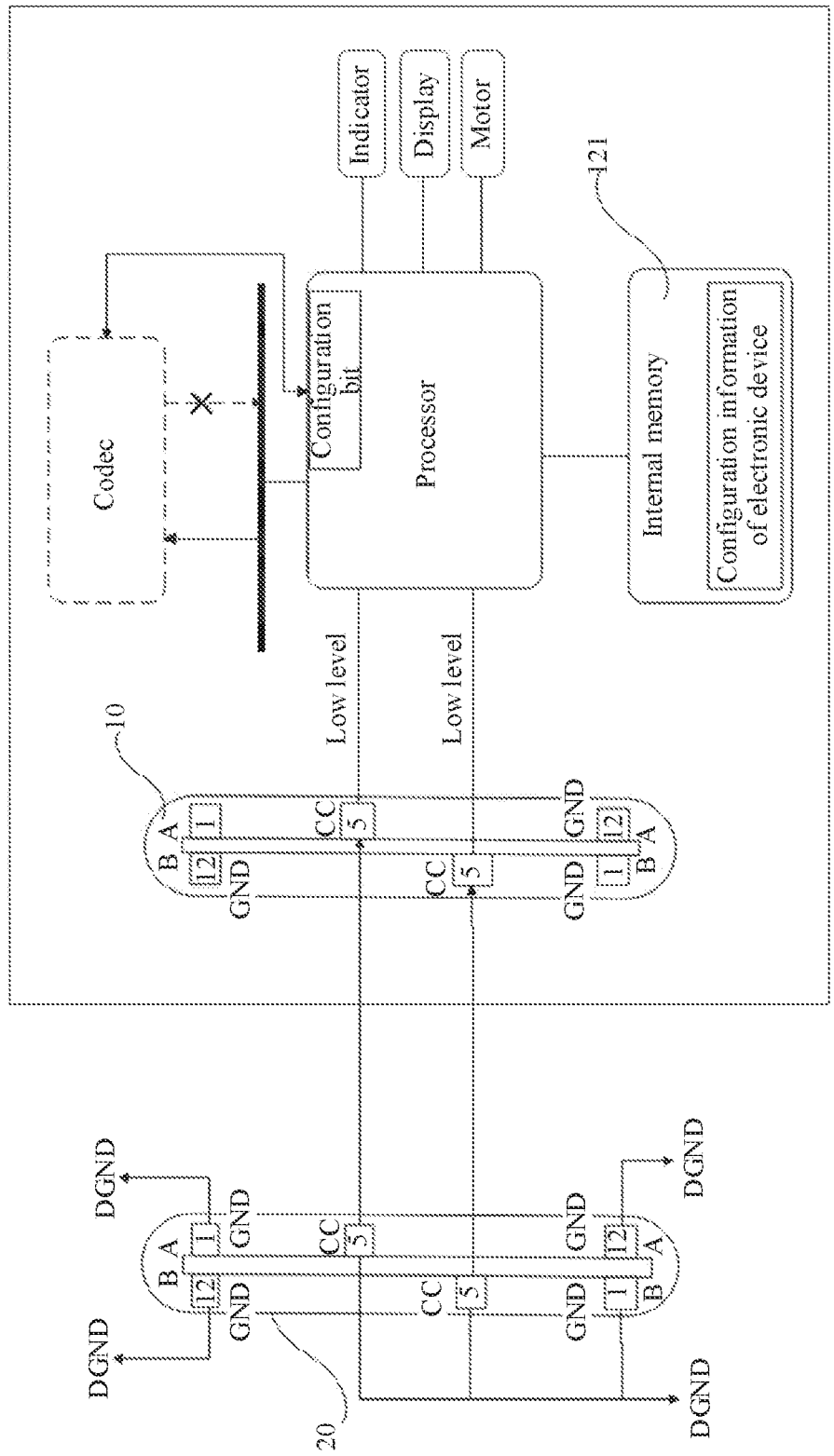
FIG. 2b is a schematic diagram of a connection circuit of the electronic device and the analog headset according to an embodiment of this application.

As shown in FIG. 2b, the electronic device port is a USB Type-C interface, and a headset plug connected to the electronic device port is also the USB Type-C interface. When the headset plug 20 is inserted into the electronic device port 10, the pins of the headset plug 20 are correspondingly connected to the pins in the electronic device port 10, and levels of the pins in the electronic device port change. In this way, it can be detected whether there is a headset connected to the electronic device port.

The CC pin in the headset plug is pulled down to the ground, and the headset plug is inserted into the electronic device port 10. Since the CC pin in the electronic device port 10 is connected to the CC pin of the headset plug 20, the CC pin in the electronic device port is also be pulled down and forms a low level. In this way, a processor of the electronic device may detect the level value of the CC pin in the electronic device port 10, to determine whether there is a headset connected to the electronic device port.

S202: Detecting whether the electronic device has a function of performing conversion function between digital audio and analog audio.

The electronic device having the function of performing conversion between digital audio and analog audio means that the electronic device supports the analog headset. The function of performing conversion between digital audio and analog audio of the electronic device can be realized by the codec. Therefore, detecting whether the electronic device has the function of performing conversion between digital audio and analog audio may be understood as detecting whether the electronic device is configured with the codec.

Whether the electronic device is configured with the codec may be detected in the following three manners.

In a first manner, configuration information of the electronic device is acquired, and it is determined whether the configuration information of the electronic device includes attribute information of the codec.

With reference to FIG. 2b, the electronic device stores configuration information of the electronic device. The configuration information of the electronic device includes attribute information of various components configured in the electronic device. FIG. 1c illustrates a structural example of the electronic device. In this example, a speaker 170A, a receiver 170B, a microphone 170C, and a headset port 130 are directly connected to a processor 110, indicating that the codec is omitted in the electronic device. Correspondingly, the configuration information of the electronic device does not include the attribute information of the codec. If the electronic device is equipped with the codec, the attribute information of the codec is included in the configuration information of the electronic device.

By querying the attribute information of the codec in the configuration information of the electronic device, it can be determined whether the electronic device is equipped with the codec.

In a second manner, a request is sent to the codec, and it is determined whether a response message is received from the codec within a preset time period.

When it is necessary to determine whether the electronic device is equipped with the codec, the electronic device may attempt to establish a connection to the codec. If the connection is successfully established, it means that the electronic device is equipped with the codec. Otherwise, the electronic device is not equipped with the codec.

With reference to FIG. 2b, the electronic device sends the request to the codec by using a unique bus of the codec. If the electronic device receives the response message from the codec within the preset time period, it means that the electronic device is equipped with the codec. If no response message is received from the codec within the preset time period, it means that the electronic device is not configured with the codec.

The preset time period may be set according to a time difference between the request message and the response message.

In a third manner, a level value of a configuration bit of the codec is read, and it is determined whether the level value of the configuration bit of the codec is a target value, where the target value is used for indicating that the electronic device is not configured with the codec.

With reference to FIG. 2b, whether the electronic device is equipped with the codec leads to a different level value of the configuration bit of the codec of the processor. For example, the electronic device is equipped with the codec, and the configuration bit of the codec of the processor is configured as high. Alternatively, the electronic device may be equipped with the codec, and the configuration bit of the codec of the processor is configured as low. By detecting the level value of the configuration bit of the codec of the processor and identifying the level value, it can be determined whether the electronic device is equipped with the codec.

FIG. 2a shows that steps S202 and S203 are performed in parallel after step S201. Alternatively, steps S202 and S203 may be performed in the following two serial manners.

I. If a headset connected to the electronic device port is detected in step S201, step S202 is first performed. A result of step S202 is that when it is detected that the electronic device does not have the function of performing conversion between digital audio and analog audio, step S203 is performed.

II. If a headset connected to the electronic device port is detected in step S201, step S203 is first. A result of step S203 is that when it is detected that the headset is the analog headset, step S202 is performed.

S203. Detecting whether the headset is the analog headset.

It can be seen from FIG. 2b that, dual CC pins of the analog headset are grounded, the headset plug 20 of the analog headset is inserted into the electronic device port 10, and the dual CC pins of the headset plug 20 establish a connection to dual CC pins in the electronic device port, causing potentials of both of the dual CC pins in the electronic device port to be pulled down, and the processor of the electronic device detects two low levels at the dual CC pins.

In the digital headset, only a single CC pin is grounded. Connecting the digital headset to the electronic device port only causes a potential of the single CC pin of the electronic device port to be pulled down. Therefore, the processor may determine whether the headset connected to the electronic device port is the analog headset by detecting potential values of the dual CC pins in the electronic device port.

If it is detected that the electronic device does not have the function of performing conversion between digital audio and analog audio and that the headset is an analog component, S204 is performed to output prompt information. The prompt information is used for indicating that the headset connected to the electronic device port is erroneous.

The electronic device not having the function of performing conversion between digital audio and analog audio means that the electronic device is not equipped with the codec and cannot complete digital-to-analog conversion of a digital audio. Since the electronic device does not support the analog headset, and the analog headset cannot be used when connected to the electronic device port. Therefore, the prompt information is required to be outputted to indicate that the headset connected to the electronic device port is erroneous and prompt the user to connect the digital headset.

A common implementation of outputting the prompt information is: displaying the prompt message on the display of the electronic device. While the prompt information is displayed on the display of the electronic device, the indicator 192 assists in the prompting or the motor 191 vibrates to assist in the prompting. Alternatively, the prompt information may be outputted by the indicator 192, the motor 191, or a combination thereof.

It can be seen from the above content that, when the headset is connected to the electronic device port, if it is detected that the electronic device does not have the function of performing conversion between digital audio and analog audio and that the headset connected to the electronic device port is the analog headset, it is determined that the headset connected to the electronic device port is erroneous, and the prompt message is outputted. In this way, the electronic device omitting the codec can provide prompt when the analog headset is connected to the electronic device port.

Figure 3A:
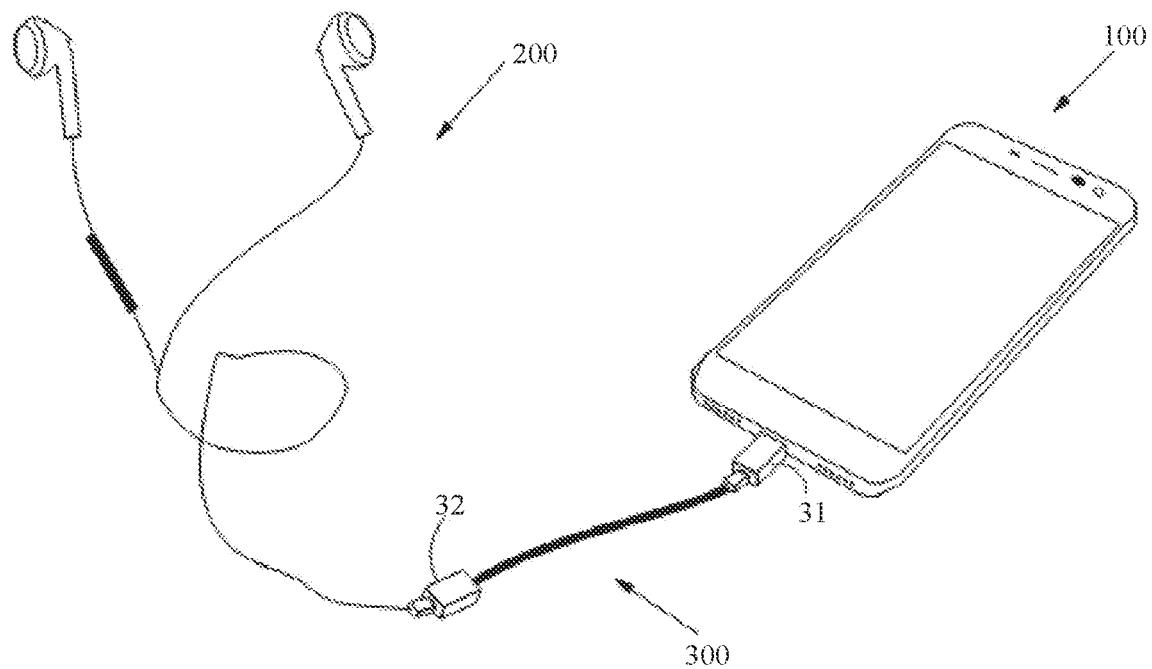
FIG. 3a is a connection diagram of the electronic device and the analog headset according to another embodiment of this application.

As described above, the analog headset generally uses a 3.5-mm plug. In order to adapt to the Type-C interface of the electronic device, the analog headset 200 is connected to the electronic device 100 by using a headset adapter 300, as shown in FIG. 3a.

Figure 3B:
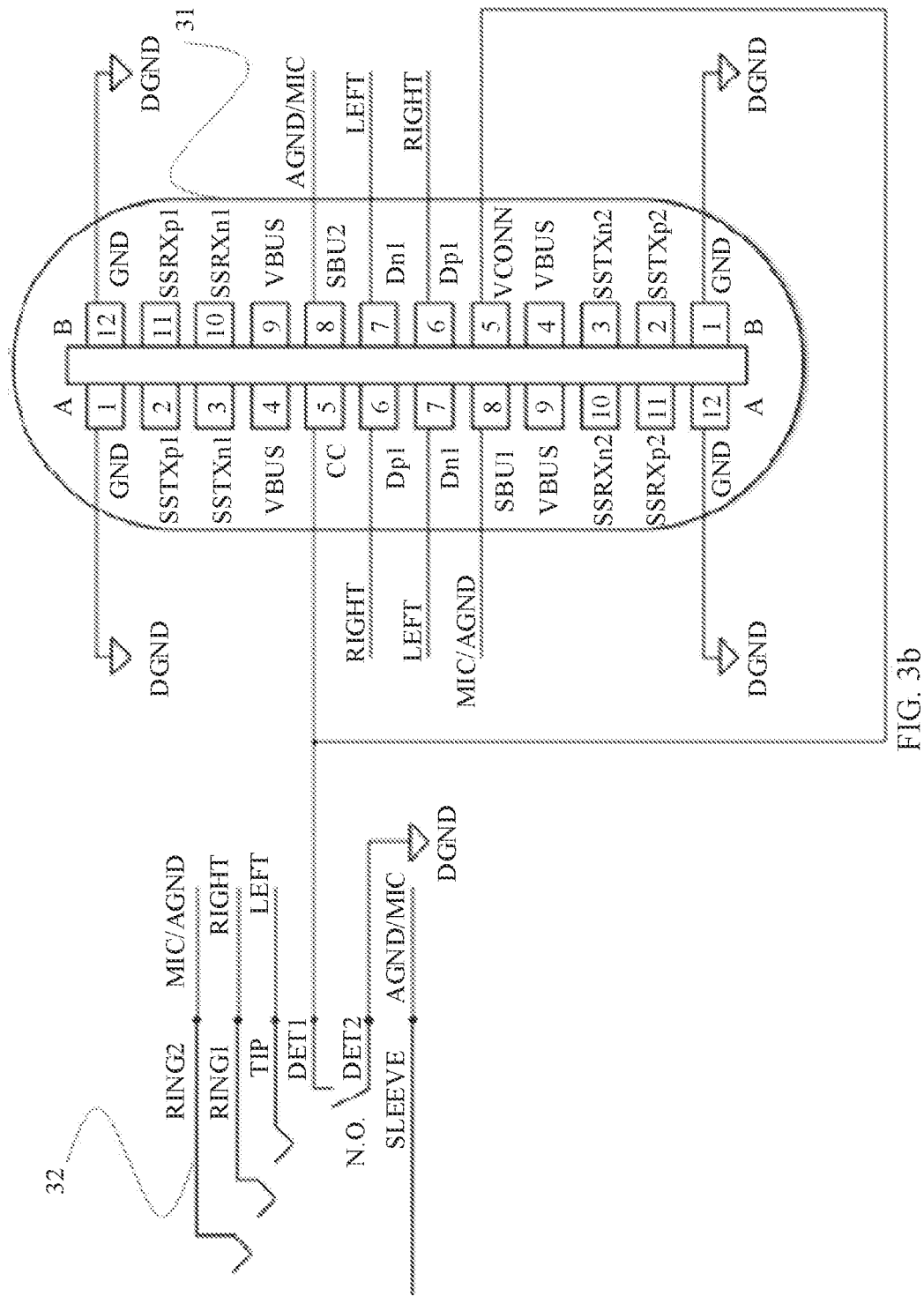
FIG. 3b is a schematic structural diagram of an analog adapter according to an embodiment of this application.

The headset adapter is classified into an analog adapter and a digital adapter. FIG. 3b shows an analog adapter. The analog adapter includes a Type-C plug 31, a socket terminal 32, and a connecting line connecting the Type-C plug 31 to the socket terminal 32. The Type-C plug 31 is configured to be connected to the Type-C interface of the electronic device, and the socket terminal 32 is configured for the headset to be connected.

In addition to the Type-C plug, the socket terminal, and the connecting line connecting the Type-C plug to the socket terminal, the digital adapter further includes an audio decoding chip. The digital adapter can complete the digital-to-analog conversion of a digital signal by using the audio decoding chip.

If the analog headset is connected to the electronic device port by the digital adapter, since the digital adapter can complete the digital-to-analog conversion of a digital signal, even if the codec is omitted in the electronic device, the digital audio outputted by the electronic device can be converted to the analog signal by the digital adapter, so that the analog headset can be used. However, if the analog headset is connected to the electronic device by the analog adapter, the analog headset still cannot be used if the electronic device is not configured with the codec.

Based on the above, by using the method for detecting a connection to an electronic device port provided in this embodiment of this application, an erroneous connection can be prompted when the analog headset is connected to the electronic device by the analog adapter and the electronic device is not configured with the codec.

Figure 3C:
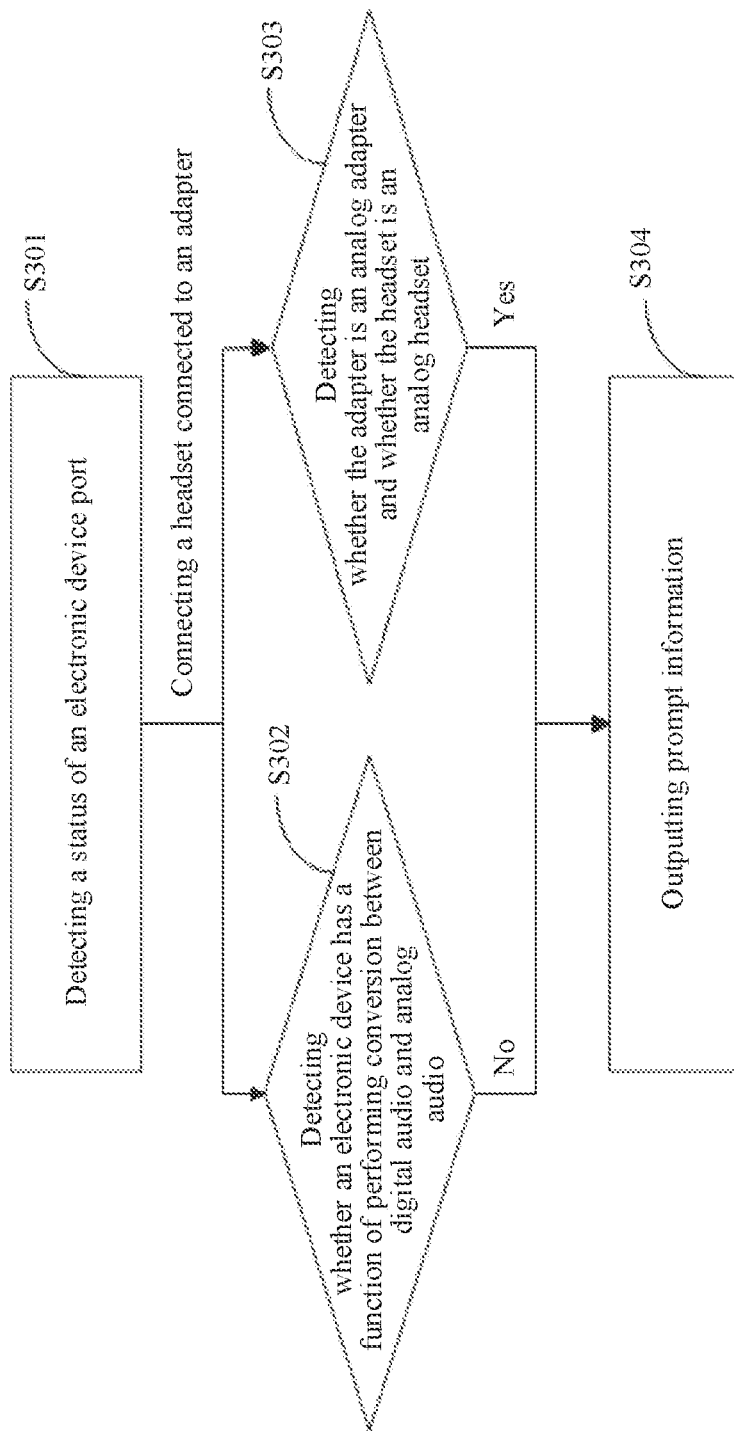
FIG. 3c is a flowchart of a method for detecting a connection to an electronic device port according to another embodiment of this application.

FIG. 3c shows a method for detecting a connection to an electronic device port according to an embodiment of this application. The method includes the following steps:

S301: Detecting a status of the electronic device port.

When it is detected that a headset is connected to the electronic device port, S302 and S303 are performed.

S302: Detecting whether an electronic device has a function of performing conversion function between digital audio and analog audio.

For specific implementations of S301 and S302, refer to the content of steps S201 and S202 in the embodiment corresponding to FIG. 2a, and details are not repeated herein.

S303: Detecting whether an adapter is the analog adapter and whether the headset is an analog headset.

Figures 1, 3D:
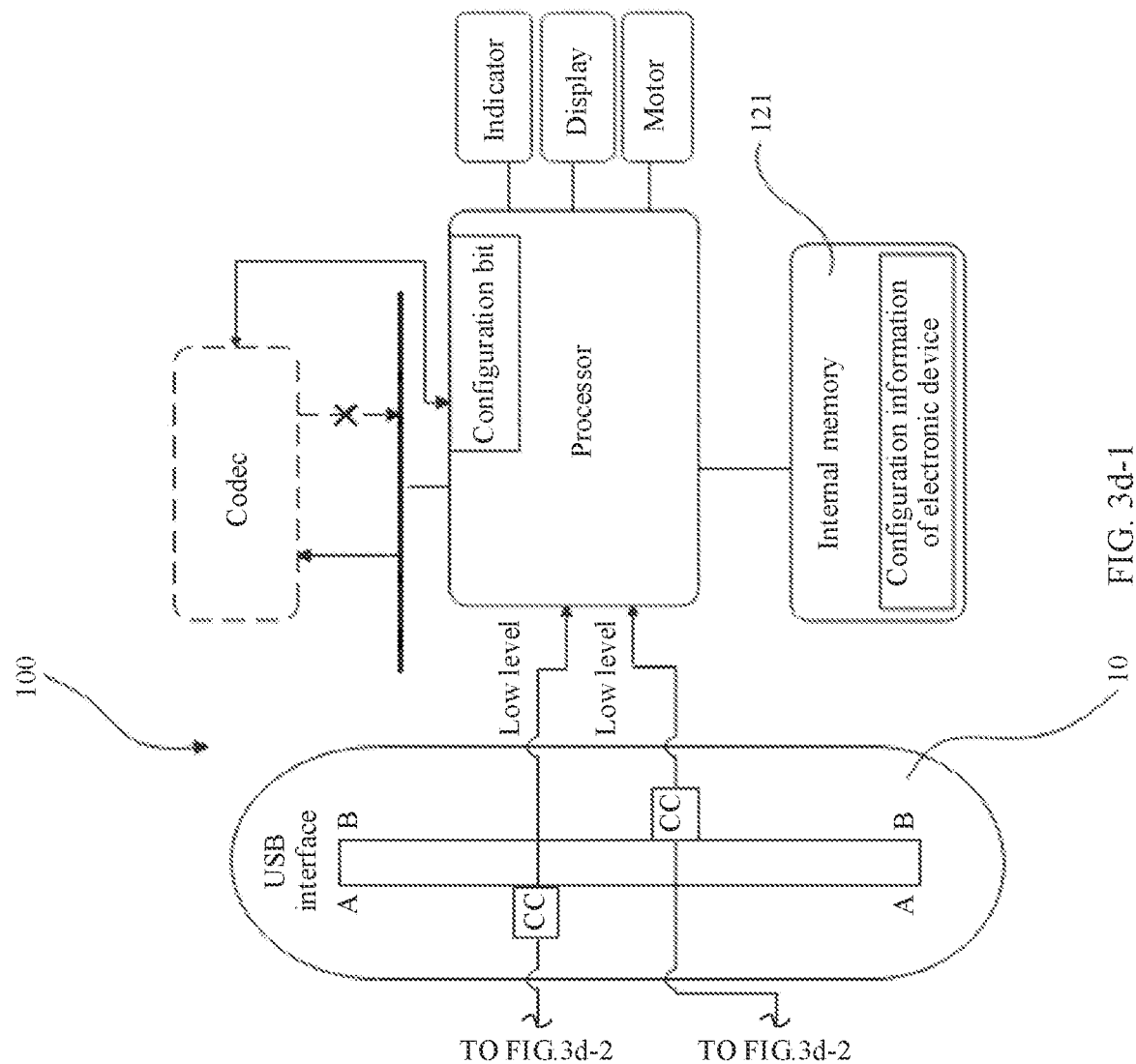
FIG. 3d-1 and FIG. 3d-2 is a schematic diagram of a connection circuit of the electronic device, the analog headset, and the analog adapter according to an embodiment of this application.
Figures 2, 3D:
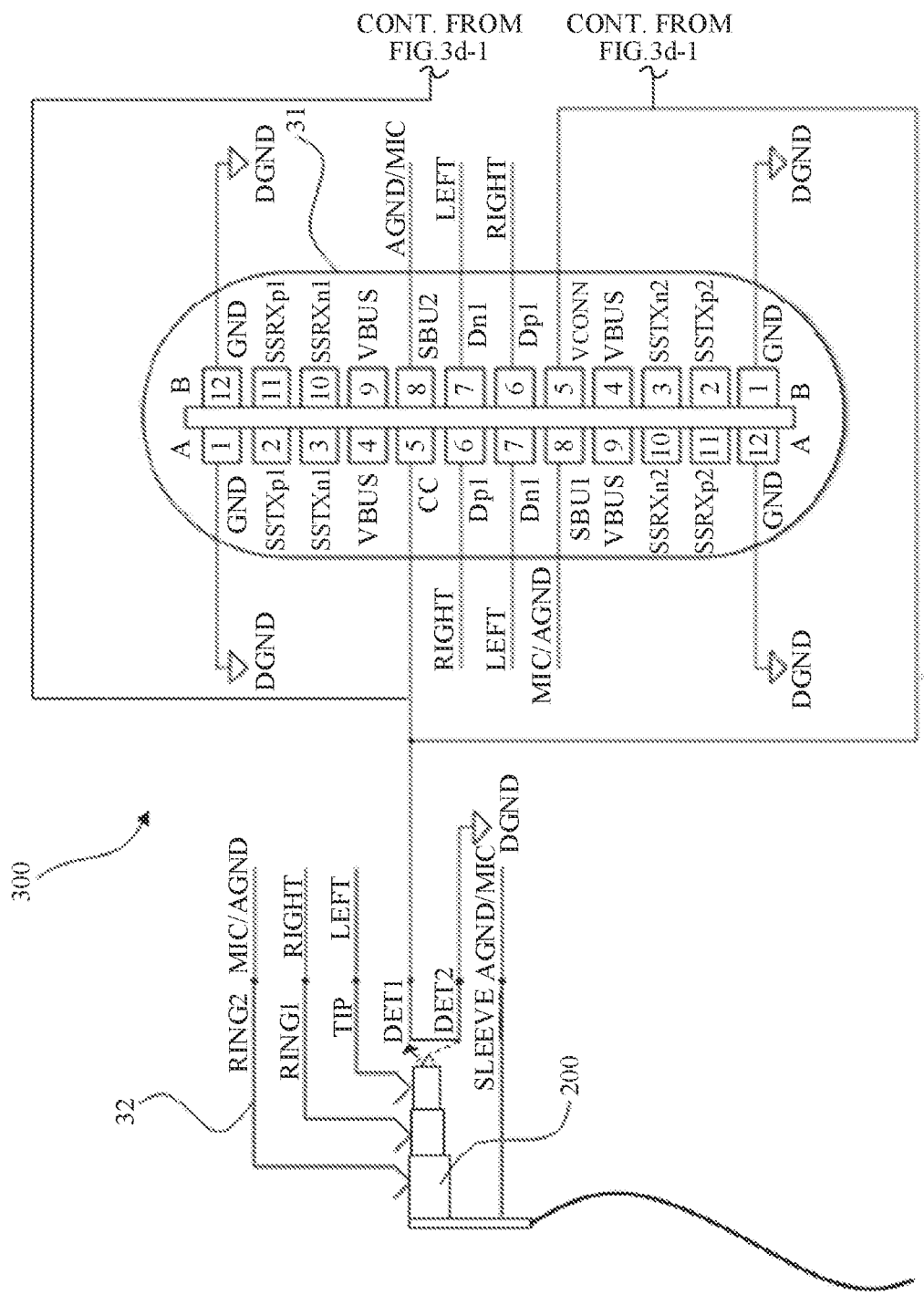

As shown in FIG. 3d-1 and FIG. 3d-2, the analog headset 200 is inserted into the socket terminal 32 of the analog adapter 300, and the Type-C plug 31 of the analog adapter 300 is inserted into the USB Type-C interface 10 of the electronic device 100. The processor of the electronic device 100 detects whether the electronic device has the function of performing conversion between digital audio and analog audio, and detects whether the connected adapter is an analog component.

A CC pin and a VCONN pin (also referred to as a CC pin) of the analog adapter are connected to a digital ground (DGND) by a switch. When the analog headset 200 is inserted into the analog adapter, the switch is driven to close, so that DET2 and DET1 are connected, and the CC pin and the VCONN pin of the analog adapter are grounded accordingly. In this way, in the electronic device 100, the potentials of the dual CC pins in the USB interface 10 are both pulled down, and the processor detects that the potentials of the dual CC pins are low levels.

It should be further noted that, a single CC pin of the digital adapter is directly grounded. Therefore, when the headset is connected to the electronic device port by the digital adapter, a voltage of the single CC pin voltage of the electronic device port is pulled down. Based on the above, it may be determined whether the adapter to which the headset is connected is the analog adapter by detecting the potential values of the dual CC pins in the electronic device port. In addition, since the single CC pin of the digital adapter is grounded, even if no headset is connected to the digital adapter and the digital adapter is connected to the electronic device port alone, it can be determined whether the connected adapter is the digital adapter by identifying the level value of the single CC pin of the electronic device port.

Steps S302 and S303 may alternatively be performed in the above two serial manners.

If it is detected that the electronic device does not have the function of performing conversion between digital audio and analog audio, that the adapter is the analog adapter, and that the headset is the analog headset, S304 is performed to output prompt information. The prompt information is used for indicating that the headset connected to the electronic device port is erroneous.

In this embodiment, if it is detected that the electronic device does not have conversion of the function between digital audio and analog audio and whether the connected adapter is the analog adapter and whether the headset is the analog headset are detected, the prompt message is also outputted to indicate that the component connected to the electronic device port is erroneous, so as to prompt the user to connect the digital headset or the digital adapter. In this way, the electronic device omitting the codec can provide prompt when the analog headset and the analog adapter are connected to the electronic device port.

Figure 4A:
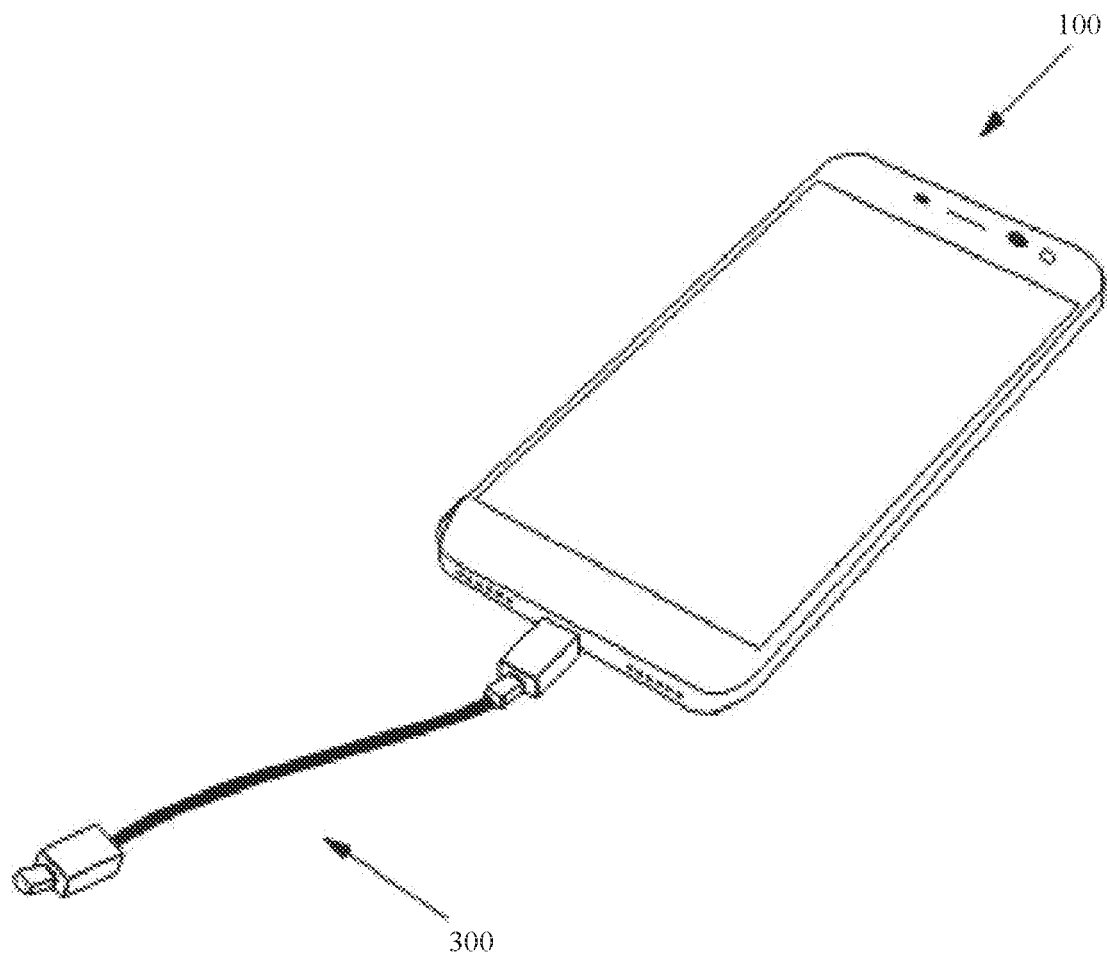
FIG. 4a is a connection diagram of the electronic device and the analog adapter according to another embodiment of this application.

As shown in FIG. 4a, the analog adapter 300 is connected to the port of the electronic device 100. No headset is connected to the analog adapter, switches to which the dual CC pins of the analog adapter are connected are in an open state, and the dual CC pins of the analog adapter are in a floating state., and therefore connecting the analog adapter to the electronic device port does not cause dual CC pull-down of the electronic device port. Therefore, it cannot be determined whether the connected adapter is the analog adapter by detecting the level values of the dual CC pins of the electronic device port.

Figure 4B:
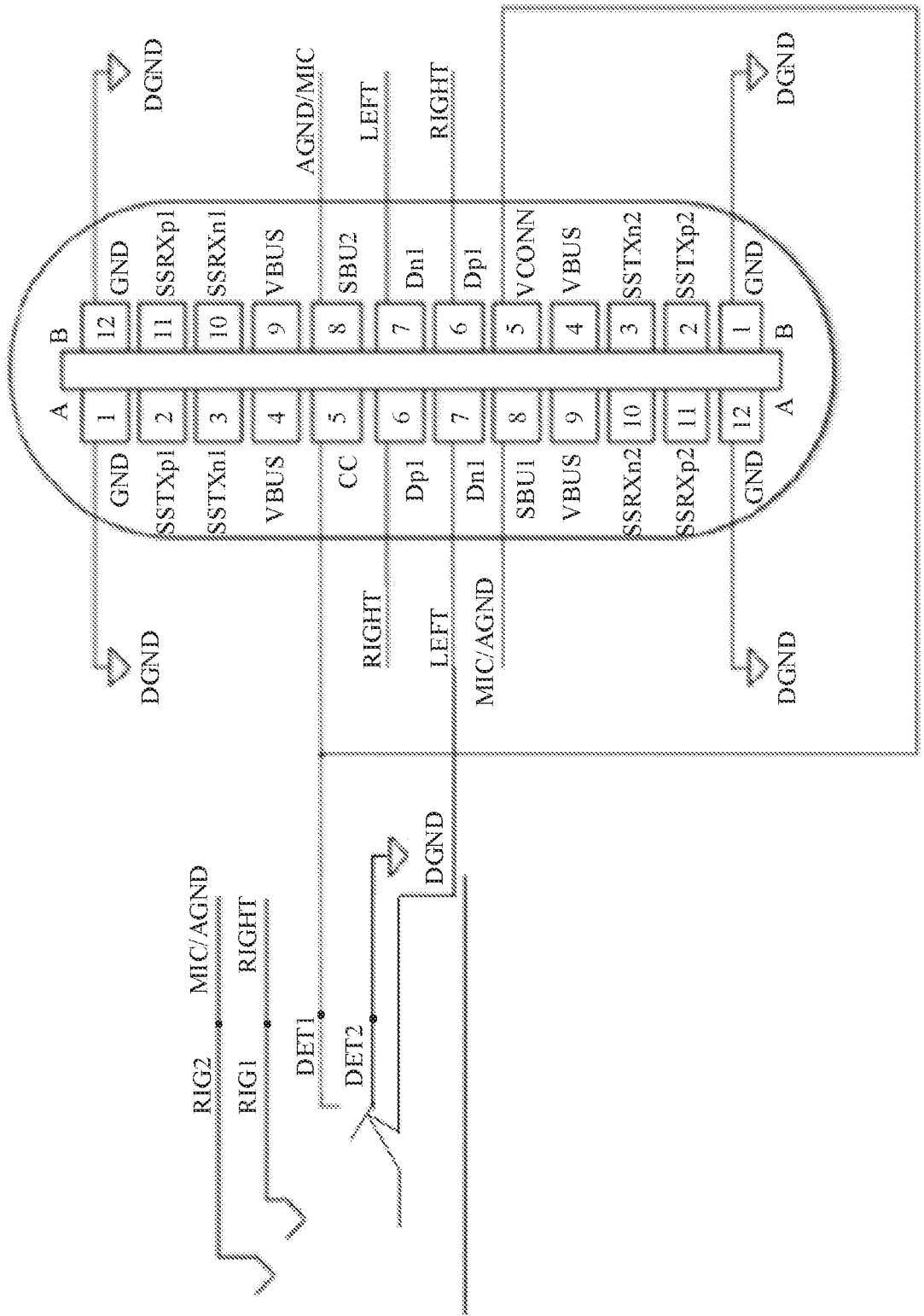
FIG. 4b is a schematic structural diagram of the analog adapter according to another embodiment of this application.

Based on the above, the following adjustment is performed on the analog adapter:

A left (LEFT) channel pin, a right (RIGHT) channel pin, or an SBU pin (configured to transmit an MIC/GND signal of the headset) is connected to the digital ground (DGND) by default. FIG. 4b shows an example of connecting the LEFT channel pin to the DGND. Since the LEFT channel pin, the RIGHT channel pins, or the SBU pin of the analog adapter is connected to the DGND by default, when the analog adapter is connected to the electronic device port, the LEFT channel pin, the RIGHT channel pin, or the SBU pin in the electronic device port is short-circuited to the ground.

The following adjustment may alternatively be performed on the analog adapter: an SS pin of the analog adapter is used as a to-be-detected pin, and the SS pin of the analog adapter is connected to the DGND. Correspondingly, in the electronic device port, the SS pin is connected to a GPIO interface or an ADC interface, and the GPIO interface or the ADC interface detects whether a level of the SS pin is a low level.

This implementation is applicable to a situation in which the analog adapter supports the SS pin and the electronic device supports the SS pin. The SS pin transmits a USB3.0 pin signal, and is configured to transmit a high-speed signal. Some electronic devices do not support USB3.0.

Figure 4C:
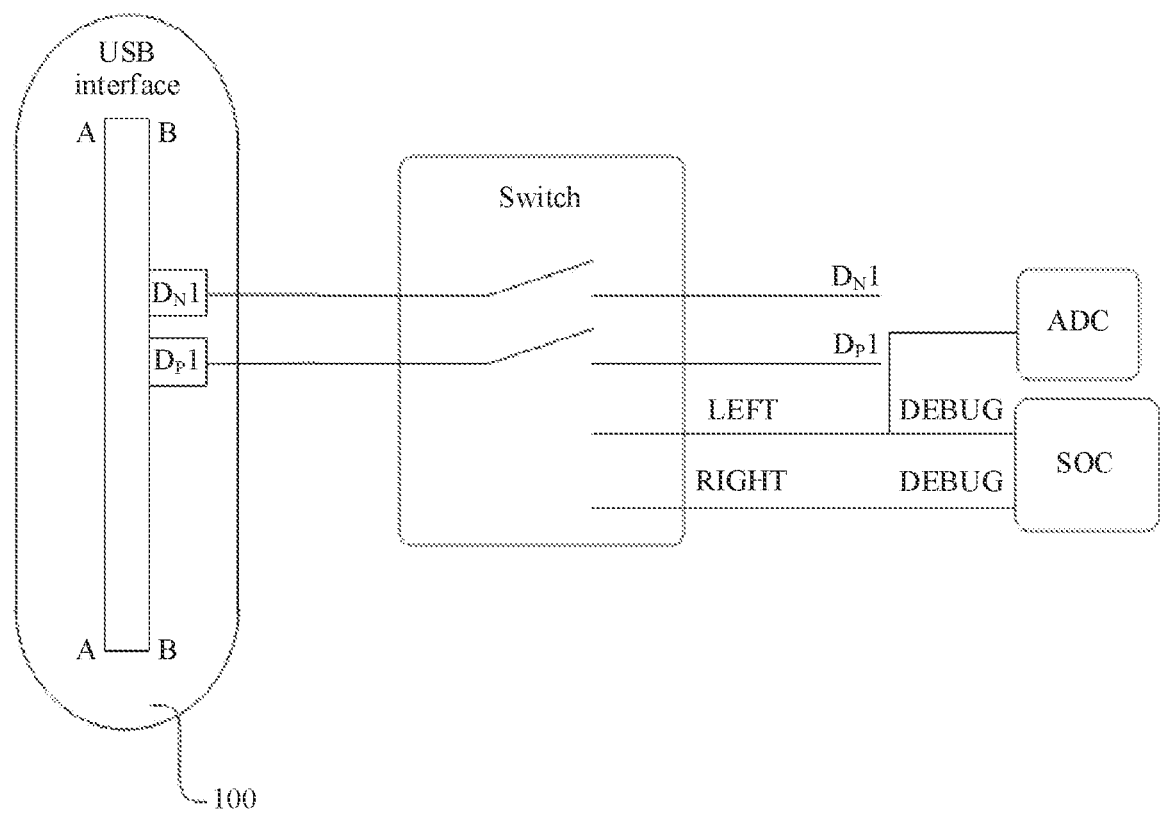
FIGS. 4c and 4d are schematic structural diagrams of a connection circuit of the electronic device port according to an embodiment of this application.

In a possible implementation, corresponding to the adjustment of the analog adapter, in the electronic device, the LEFT channel pin, the RIGHT channel pin, or the SBU pin is connected to a branch of an SOC, and is connected to the ADC interface or the GPIO interface, so that the ADC interface or the GPIO interface detects the level value of the LEFT channel pin, the RIGHT channel pin, or the SBU pin. FIG. 4c illustrates an example in which the ADC interface is connected to the LEFT channel pin and the branch of the SOC.

The adapter is connected to the electronic device port, and the pins of the adapter are correspondingly connected to the pins of the electronic device port. The system-on-chip (SOC) of the electronic device sends a control instruction, and switches of the $D_P1$ pin (also referred to as a right channel pin) and the $D_N1$ pin (also referred to as a left channel pin) of the electronic device port shown in FIG. 4b are switched to a DEBUG channel (which is a serial port channel) in response to the control instruction.

In the above example, since the LEFT channel pin of the adapter is connected to the DGND, a LEFT channel pin in the electronic device port is also connected to DGND, and is at a low level. Therefore, the ADC interface detects that the low level of the LEFT channel pin. It may be determined that, since the analog adapter is connected to the electronic device port, prompt information may be generated to prompt that the analog adapter is connected to the electronic device port.

Figure 4D:
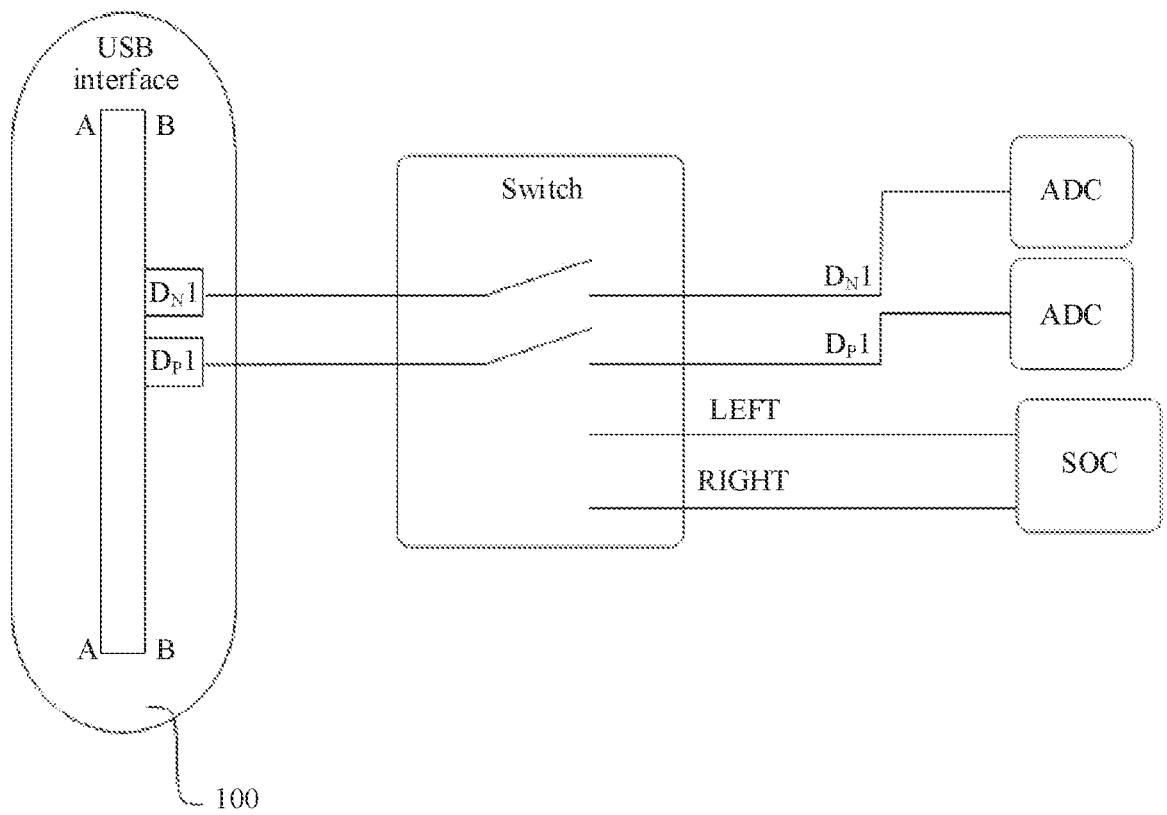

In another possible implementation, the $D_P1$ pin, the $D_N1$ pin, or the SBU pin of the electronic device port is connected to the ADC interface or the GPIO interface. In an example shown in FIG. 4d, the $D_P1$ pin and the $D_N1$ pin of the electronic device port are connected to the ADC interface. When the adapter is connected to the electronic device port, since the LEFT channel pin of the adapter is connected to DGND, the ADC interface detects that the LEFT channel pin is at a low level, so that a prompt message may be generated to indicate that the analog adapter is connected to the electronic device port.

Figure 4E:
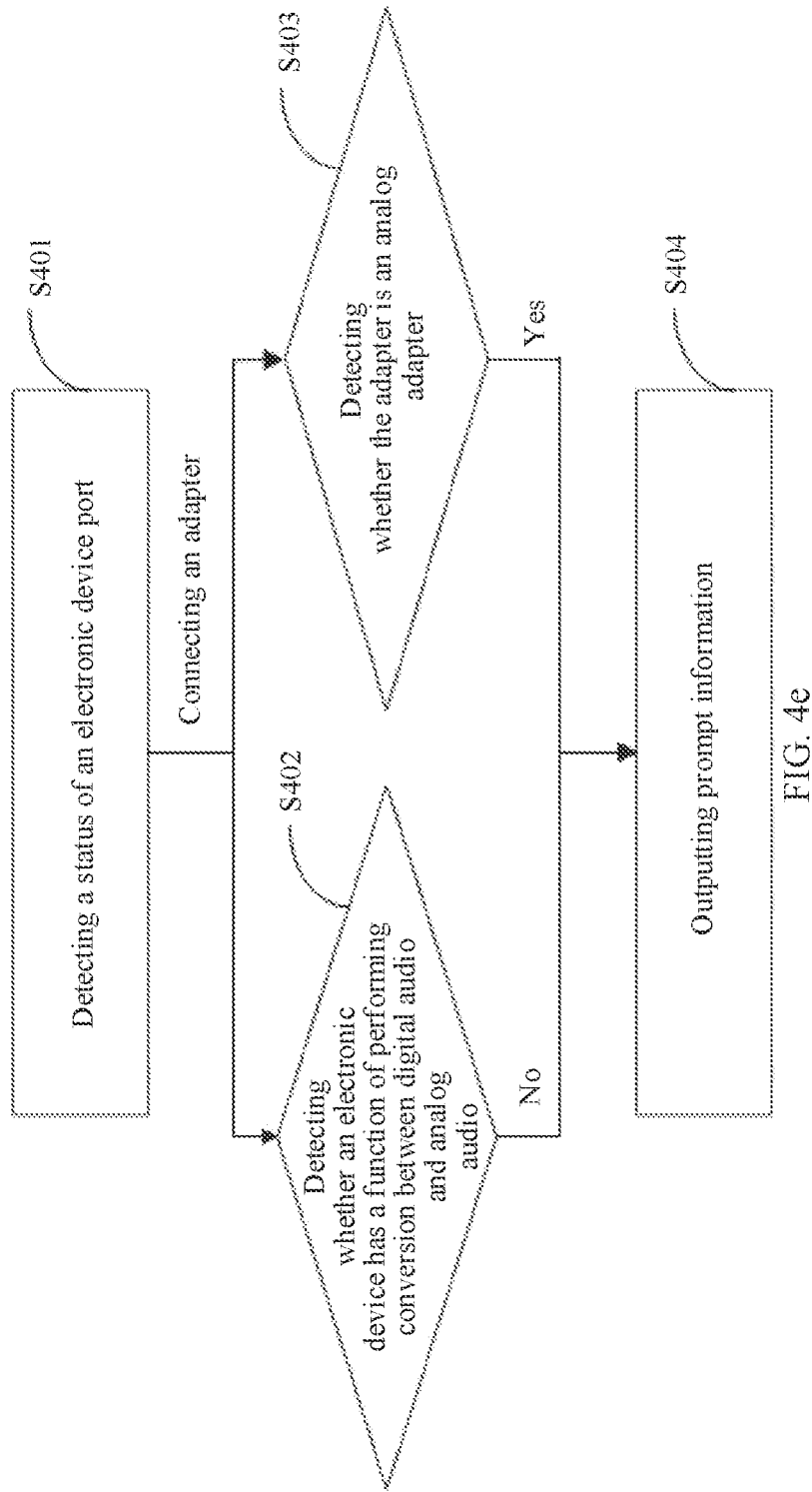
FIG. 4e is a flowchart of a method for detecting a connection to an electronic device port according to another embodiment of this application.

FIG. 4e shows a method for detecting a connection to an electronic device port according to an embodiment of this application. The method includes the following steps:

S401: Detecting a status of the electronic device port.

When it is detected that an adapter is connected to the electronic device port, S402 and S403 are performed.

S402: Detecting whether an electronic device has a function of performing conversion function between digital audio and analog audio.

For specific implementations of S401 and S402, refer to the content of steps S201 and S202 in the embodiment corresponding to FIG. 2a, and details are not repeated herein.

S403: Detecting whether the adapter is the analog adapter.

Figures 1, 4F:
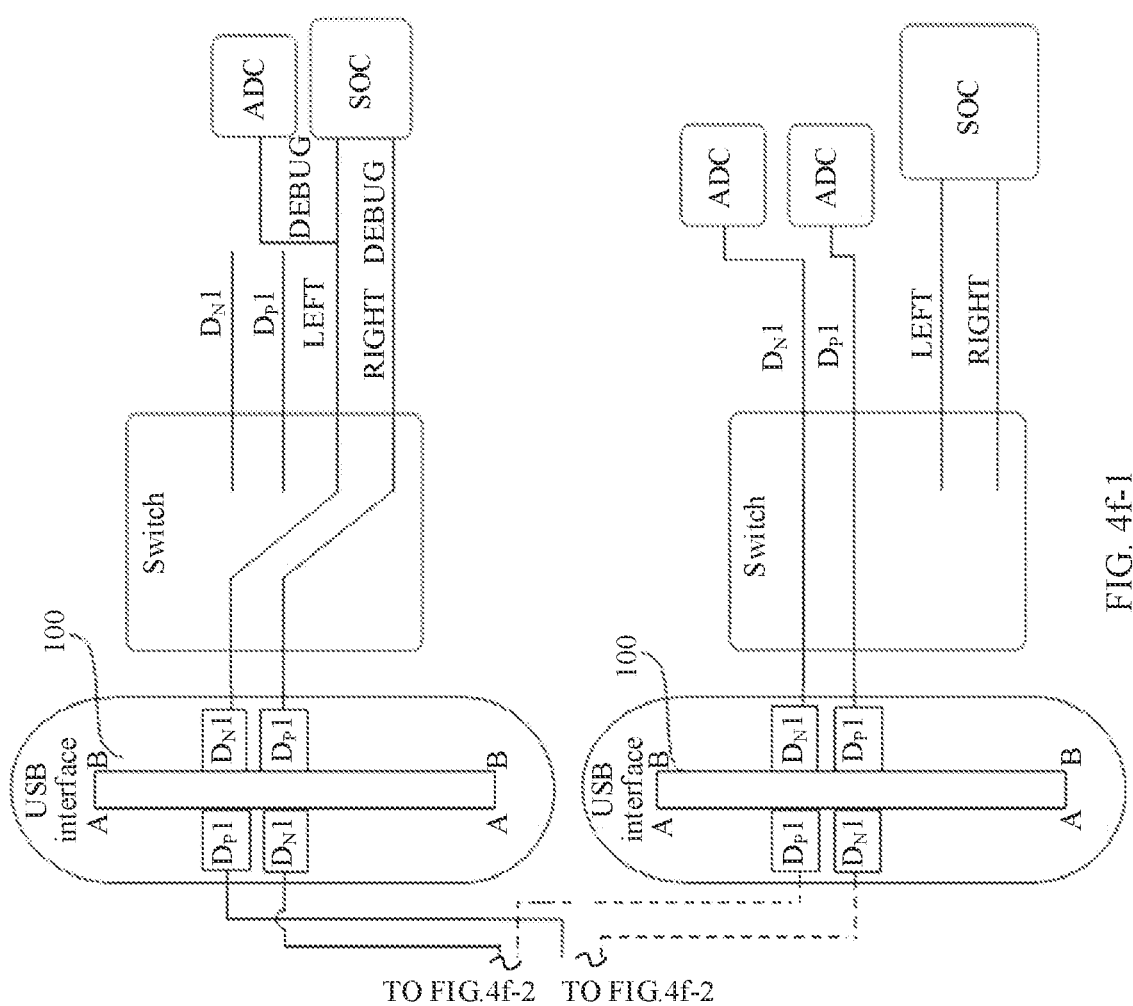
Figures 2, 4F:
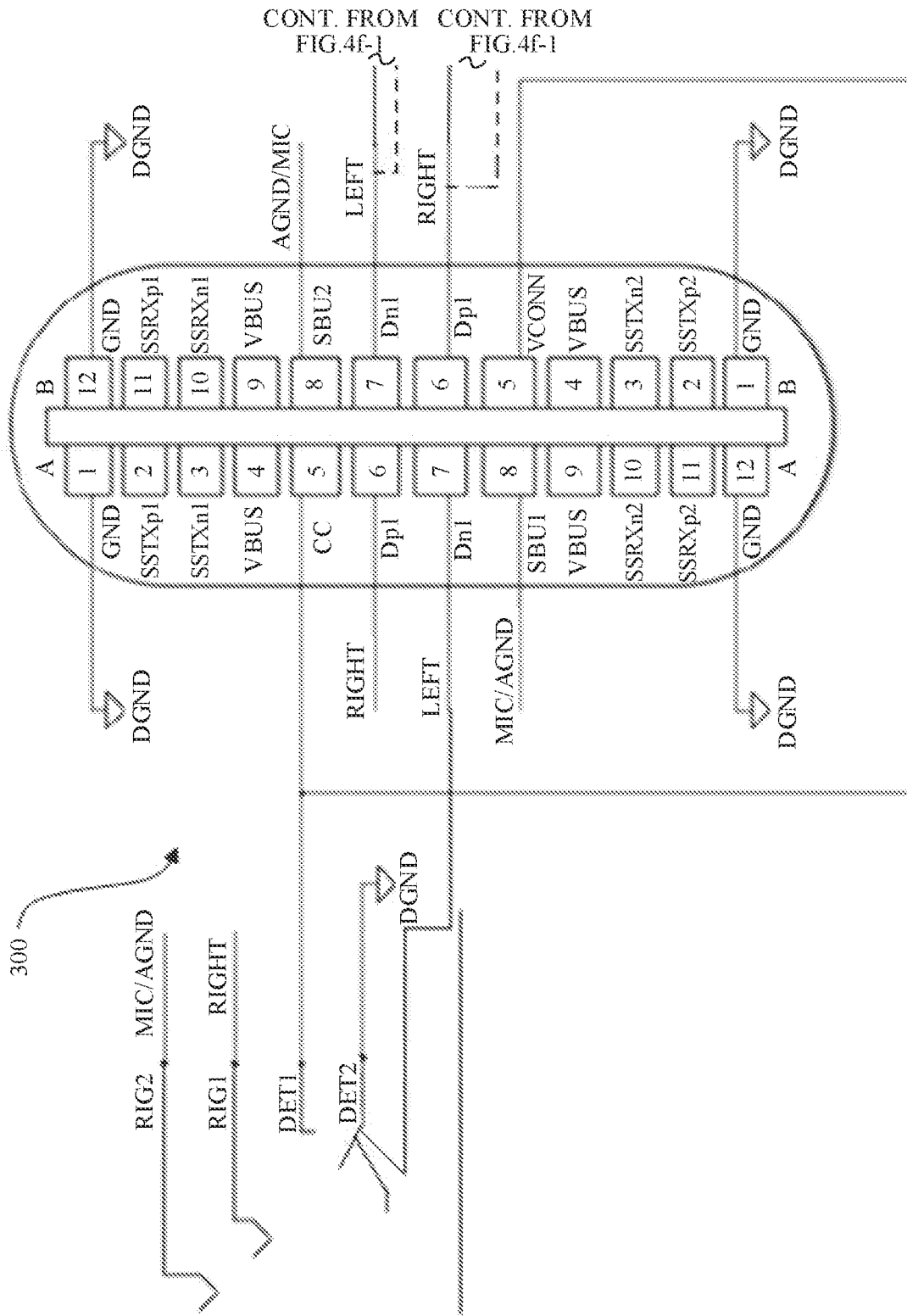

As shown in FIG. 4f-1 and FIG. 4f-2, the analog adapter 300 is inserted into the electronic device port 100, and the pins of the analog adapter 300 are correspondingly connected to the pins of the electronic device port 100. The $D_N1$ pin of the analog adapter 300 is connected to the DGND, the $D_N1$ pin of the electronic device port 100 is also grounded correspondingly, and the ADC detects that the $D_N1$ pin of the electronic device port 100 is at a low level. In this way, it can be detected that the adapter is the analog adapter.

Steps S402 and S403 may alternatively be performed in the above two serial manners.

If it is detected that the electronic device does not have the function of performing conversion between digital audio and analog audio and that the adapter is the analog adapter, S404 is performed to output prompt information. The prompt information is used for indicating that the adapter connected to the electronic device port is erroneous.

In this embodiment, if it is detected that the electronic device does not have conversion of the function between digital audio and analog audio and whether the connected adapter is the analog adapter is detected, the prompt message is outputted to indicate that the adapter connected to the electronic device port is erroneous, so as to prompt the user to connect the digital headset or the digital adapter. In this way, the electronic device omitting the codec can provide prompt when the analog adapter is connected to the electronic device port.

Figures 2, 4G:
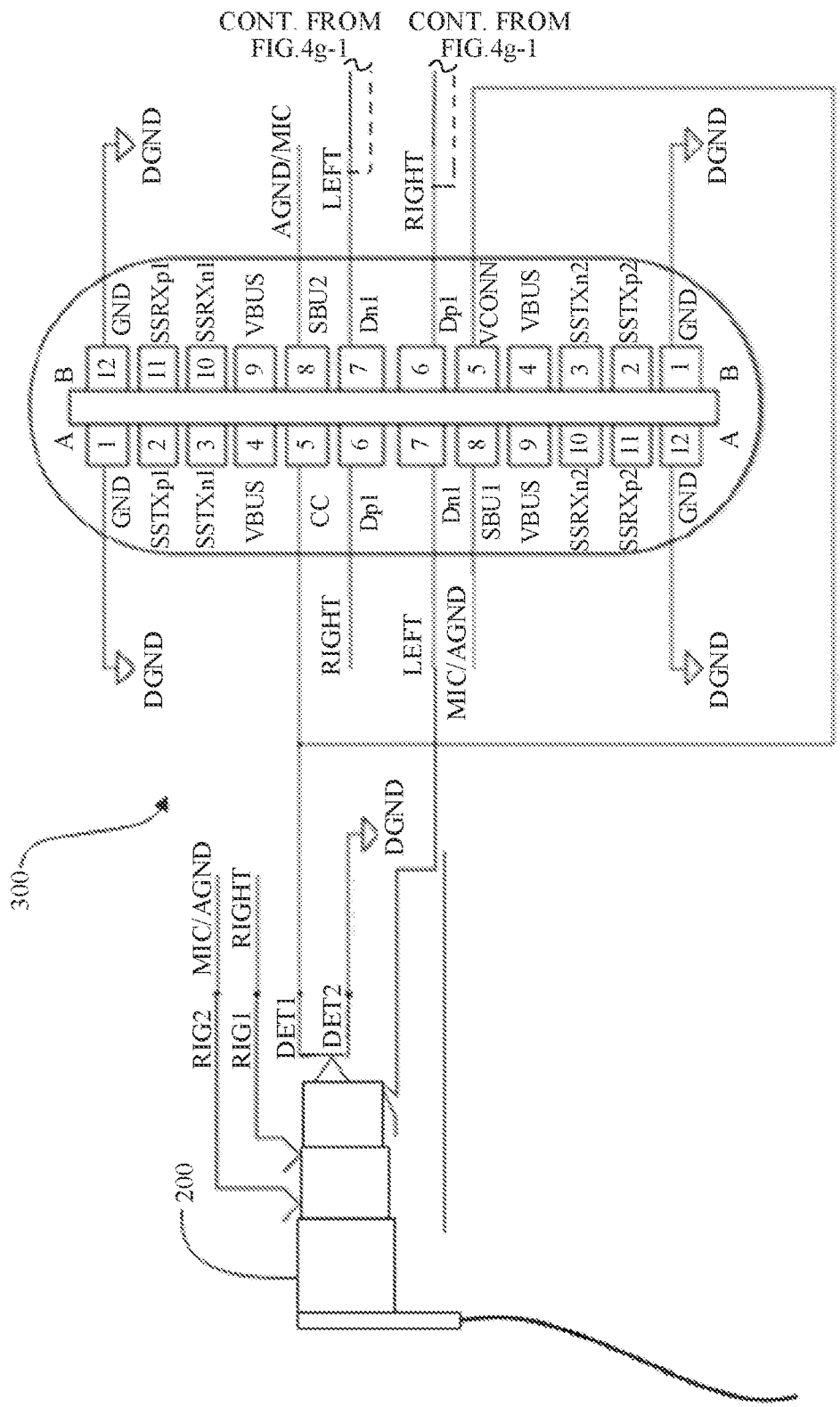

It should be further noted that, as shown in FIG. 4g-1 and FIG. 4g-2, when the analog headset 200 is inserted into the analog adapter 300 that is inserted into the electronic device port 100, the plug of the analog headset 200 establishes a connection between DET2 and DET1, and disconnects short-circuited ground of the LEFT channel pin. The ADC interface detects that the level of the LEFT channel pin changes to a high level, and the potential values of the dual CC pins in the electronic device port 100 are pulled down to low levels. Since the potential values of the dual CC pins in the electronic device port 100 are pulled down to the low levels, it can be detected that the component connected to the electronic device port 100 is: the analog adapter+the analog headset.

Figure 5:
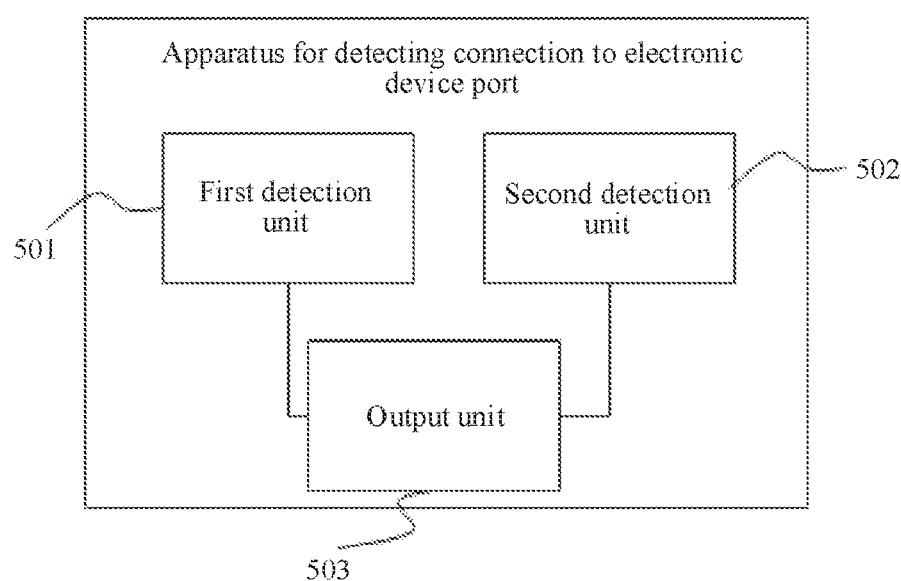
FIG. 5 is a schematic structural diagram of an apparatus for detecting a connection to an electronic device port according to an embodiment of this application.

An embodiment of this application further provides an apparatus for detecting a connection to an electronic device port. As shown in FIG. 5, the apparatus includes:

- a first detection unit 501, configured to detect whether an electronic device has a function of performing conversion between digital audio and analog audio when a component is connected to the electronic device port;
- a second detection unit 502, configured to detect whether the component is an analog component when the component is connected to the electronic device port, where the component includes a headset and a headset adapter; and
- a determining unit 503, configured to determine that the component connected to the electronic device port is erroneous if it is detected that the electronic device does not have the function of performing conversion between digital audio and analog audio and whether the component is the analog component is detected.

In a possible implementation, during the detection whether the electronic device has the function of performing conversion between digital audio and analog audio, the first detection unit 501 is configured to:

- acquire configuration information of the electronic device; determine whether the configuration information of the electronic device includes attribute information of a codec; or
- send a request to the codec; determine whether a response message is received from the codec within a preset time period; or
- read a level value of a configuration bit of the codec, and determine whether the level value of the configuration bit of the codec is a target value, where the target value is used for indicating that the electronic device is not configured with the codec.

In a possible implementation, during the detection whether the component is the analog component, the second detection unit 502 is configured to detect whether level values of dual CC pins of the electronic device port are low levels. If it is detected that the level values of the dual CC pins of the electronic device port are the low levels, it indicates that the component is the analog component.

In a possible implementation, that the second detection unit 502 detects whether the component is the analog component includes: detecting whether a level value of a target pin of the electronic device port is a low level. The target pin includes a left channel pin, a right channel pin, a first pin, or a second pin, where the first pin is configured to transmit a signal of a microphone or the ground, and the second pin is configured to transmit a high-speed signal. If it is detected that the level value of the target pin of the electronic device port is the low level, it indicates that the component is the analog component.

In a possible implementation, the apparatus for detecting a connection to an electronic device port further includes:

- an output unit, configured to output prompt information after the determining unit determines that the component connected to the electronic device port is erroneous, where the prompt information is used for indicating that the component connected to the electronic device port is erroneous.

According to the apparatus for detecting a connection to an electronic device port provided in this embodiment of this application, when the component is connected to the electronic device port, the first detection unit 501 detects whether the electronic device has the function of performing conversion between digital audio and analog audio, the second detection unit 502 detects whether the component is the analog component, and when the output unit 503 detects that the electronic device does not have the function of performing conversion between digital audio and analog audio, and detects whether the component is the analog component, it is determined that the component connected to the electronic device port is erroneous. In this way, the electronic device not configured with the codec can report an error when the analog component is connected to the electronic device port.

Another embodiment of this application provides a readable storage medium. Instructions in the readable storage medium, when executed by a processor of an electronic device, cause the electronic device to perform the method for detecting a connection to an electronic device port in any of the above embodiments.

The readable storage medium may be a non-transitory computer-readable storage medium. For example, the non-transitory computer-readable storage medium may be a ROM, a random access memory (RAM), a CD-ROM, a magnetic tape, a floppy disk, an optical data storage device, or the like.

What is claimed is:

1. An electronic device, comprising:
   a headset port configured to be connected to a headset component, wherein the headset component comprises a headset or a headset adapter; and
   a processor coupled to the headset port, wherein the processor is configured to:
   acquire configuration information of the electronic device, wherein the electronic device does not have a function of converting between digital audio and analog audio if the configuration information does not comprise attribute information of a codec that supports conversion between digital audio and analog audio; and
   indicate that the headset port does not support the connected headset component in a case that:
   the electronic device does not have the function of converting between digital audio and analog audio; and
   the headset component connected to the headset port is an analog component.

2. The electronic device of claim 1, wherein the processor is further configured to send a request to a codec that supports conversion between digital audio and analog audio, and wherein the electronic device does not have the function of converting between digital audio and analog audio if no response message is received from the codec that supports conversion between digital audio and analog audio within a preset time period.

3. The electronic device of claim 1, wherein the processor is further configured to read a level value of a configuration bit of a codec that supports conversion between digital audio and analog audio, and wherein the electronic device does not have the function of converting between digital audio and analog audio if the level value of the configuration bit of the codec is a target value that indicates that the electronic device is not configured with the codec that supports conversion between digital audio and analog audio.

4. The electronic device of claim 1, wherein the processor is further configured to detect level values of dual CC pins of the headset port, and wherein the headset component is an analog component if the level values of the dual CC pins of the headset port are low levels.

5. The electronic device of claim 1, wherein a target pin of the headset port is connected to a detection interface, the detection interface is configured to detect a level value of the target pin, and the target pin comprises a left channel pin, a right channel pin, a first pin configured to transmit a signal of a microphone or ground, or a second pin configured to transmit a high-speed signal, wherein the processor is further configured to detect the level value of the target pin is through the detection interface, and wherein the headset component is an analog component if the level value of the target pin is a low level.

6. The electronic device of claim 1, further comprising a motor, a display, an indicator, or a combination thereof that is configured to output prompt information in response to an instruction generated in a case that the processor indicates that the headset port does not support the connected headset component, wherein the prompt information indicates that the headset port does not support the connected headset component.

7. The electronic device of claim 1, wherein the headset port is a universal serial bus (USB) Type-C interface.

8. A method for detecting a connection to a headset port of an electronic device, the method comprising:
    detecting that a headset component is connected to the headset port, wherein the headset component comprises a headset or a headset adapter;
    acquiring configuration information of the electronic device, wherein the electronic device does not have a function of converting between digital audio if the configuration information does not comprise attribute information of a codec that supports conversion between digital audio and analog audio; and
    indicating that the headset port does not support the connected headset component if the electronic device does not have the function of converting between digital audio and analog audio and the headset component is an analog component.

9. The method of claim 8, further comprising sending a request to the codec, wherein the electronic device does not have the function of converting between digital audio and analog audio if no response message is received from the codec within a preset time period.

10. The method of claim 8, wherein the headset component is an analog component if level values of dual CC pins of the headset port are low levels.

11. The method of claim 8, wherein a target pin of the headset port of the electronic device is connected to a detection interface, the detection interface is configured to detect a level value of the target pin, and the target pin comprises a left channel pin, a right channel pin, a first pin configured to transmit a signal of a microphone or ground, or a second pin configured to transmit a high-speed signal, and wherein the headset component is the analog component if the level value of the target pin is detected as a low level through the detection interface.

12. The method of claim 8, further comprising outputting prompt information that indicates that the headset port does not support the connected headset component if the headset port does not support the connected headset component.

13. The method of claim 12 further comprising providing the prompt information with a motor, a display, an indicator, or a combination thereof.

14. The method of claim 8, further comprising reading a level value of a configuration bit of the codec, wherein the electronic device does not have the function of converting between digital audio and analog audio if the level value of the configuration bit of the codec is a target value that indicates that the electronic device is not configured with the codec.

15. A non-transitory computer-readable storage medium containing instructions that, when executed by a processor of an electronic device, cause the processor to be configured to:
    detect that a headset component is connected to a headset port of the electronic device, wherein the headset component comprises a headset or a headset adapter;
    acquiring configuration information of the electronic device, wherein the electronic device does not have a function of converting between digital audio and analog audio if the configuration information does not comprise attribute information of a codec that supports conversion between digital audio and analog; and
    indicate that the headset port does not support the connected headset component if the electronic device does not have the function of converting between digital audio and analog audio and the headset component is an analog component.

16. The non-transitory computer-readable medium of claim 15, wherein the processor is further configured to send a request to a codec that supports conversion between digital audio and analog audio, and wherein the electronic device does not have the function of converting between digital audio and analog audio if no response message is received from the codec that supports conversion between digital audio and analog audio within a preset time period.

17. The non-transitory computer-readable medium of claim 15, wherein the processor is further configured to read a level value of a configuration bit of a codec that supports conversion between digital audio and analog audio, and wherein the electronic device does not have the function of converting between digital audio and analog audio if the level value of the configuration bit of the codec is a target value, that indicates that the electronic device is not configured with the codec that supports conversion between digital audio and analog audio.

18. The non-transitory computer-readable medium of claim 15, wherein the processor is further configured to detect level values of dual CC pins of the headset port, and wherein the headset component is an analog component if the level values of the dual CC pins of the headset port are low levels.

19. The non-transitory computer-readable medium of claim 15, wherein a target pin of the headset port is connected to a detection interface, the detection interface is configured to detect a level value of the target pin, and the target pin comprises a left channel pin, a right channel pin, a first pin configured to transmit a signal of a microphone or ground, or a second pin configured to transmit a high-speed signal, wherein the processor is further configured to detect the level value of the target pin through the detection interface, and wherein the headset component is an analog component if the level value of the target pin is a low level.

20. The non-transitory computer-readable medium of claim 15, wherein after the processor indicates that the headset port does not support the connected headset component, the processor is further configured to cause the electronic device to output prompt information that indicates that the headset port does not support the connected headset component.

* * * * *

UNITED STATES PATENT AND TRADEMARK OFFICE
CERTIFICATE OF CORRECTION

PATENT NO. : 12,302,055 B2
APPLICATION NO. : 17/924004
DATED : May 13, 2025
INVENTOR(S) : Ting Huang, Changying Zhang and Chen Zhu Page 1 of 1

It is certified that error appears in the above-identified patent and that said Letters Patent is hereby corrected as shown below:

In the Claims

Claim 5, Column 17, Lines 5-6: "target pin is through the" should read "target pin through the"

Claim 17, Column 18, Line 36: "value, that indicates" should read "value that indicates"

Signed and Sealed this
Seventeenth Day of June, 2025

Coke Morgan Stewart
*Acting Director of the United States Patent and Trademark Office*